(12) United States Patent
Mascari

(10) Patent No.: US 9,579,810 B2
(45) Date of Patent: Feb. 28, 2017

(54) POWER OPERATED ROTARY KNIFE WITH VACUUM ATTACHMENT ASSEMBLY

(71) Applicant: Bettcher Industries, Inc., Birmingham, OH (US)

(72) Inventor: Nicholas A. Mascari, Wellington, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 15 days.

(21) Appl. No.: 14/811,221

(22) Filed: Jul. 28, 2015

(65) Prior Publication Data

US 2016/0031104 A1 Feb. 4, 2016

Related U.S. Application Data

(63) Continuation-in-part of application No. 14/446,005, filed on Jul. 29, 2014, now Pat. No. 9,452,541.

(51) Int. Cl.
*B26B 25/00* (2006.01)
*A22C 17/04* (2006.01)
*B26D 7/18* (2006.01)

(52) U.S. Cl.
CPC ............ *B26B 25/002* (2013.01); *A22C 17/04* (2013.01); *B26D 7/1863* (2013.01)

(58) Field of Classification Search
CPC ...... B26B 25/002; B26D 7/1863; A22C 17/04
USPC ...................................... 30/124; 83/24, 100
See application file for complete search history.

(56) References Cited

U.S. PATENT DOCUMENTS

| 1,476,345 | A | * | 12/1923 | McGee | F16C 23/043 384/275 |
| 2,656,012 | A | * | 10/1953 | Thorpe | F16N 3/12 184/5.1 |
| 2,827,657 | A | | 4/1954 | Bettcher | |
| 3,024,532 | A | * | 3/1962 | Bettcher | B26B 25/002 30/276 |

(Continued)

FOREIGN PATENT DOCUMENTS

| DE | 4302912 A1 | 8/1994 |
| DE | 29512854 U1 | 11/1995 |

(Continued)

*Primary Examiner* — Sean Michalski
(74) *Attorney, Agent, or Firm* — Tarolli, Sundheim, Covell & Tummino LLP

(57) ABSTRACT

A power operated rotary knife including: a handle assembly, a head assembly and a vacuum attachment assembly. The handle assembly includes an elongated cylindrical handle housing defining a handle assembly longitudinal axis extending through a throughbore of the handle housing. The head assembly includes a rotary knife blade rotatably supported for rotation about an axis of rotation in a blade housing and a frame securing the blade housing to the distal end of the handle assembly in a position offset from the handle housing, the axis of rotation of the rotary knife blade being spaced apart from and parallel to the handle longitudinal axis. The vacuum attachment assembly includes an adapter including an upper boss affixed to the frame and a body for receiving a vacuum hose. A central axis of the adapter is parallel with respect to the rotary knife blade central axis and the handle assembly longitudinal axis.

20 Claims, 18 Drawing Sheets

(56) References Cited

U.S. PATENT DOCUMENTS

| | | | |
|---|---|---|---|
| 3,147,513 A * | 9/1964 | Schneider | A22B 5/0094 452/122 |
| 3,214,869 A | 11/1965 | Stryker | |
| 3,269,010 A * | 8/1966 | Bettcher | A22C 17/04 30/276 |
| 3,461,557 A * | 8/1969 | Behring | B26B 25/002 30/276 |
| 3,688,403 A * | 9/1972 | Bettcher | B26B 25/002 30/276 |
| 3,816,875 A * | 6/1974 | Duncan | B26D 1/15 452/149 |
| 3,852,882 A * | 12/1974 | Bettcher | A22B 5/165 30/276 |
| 4,170,063 A | 10/1979 | Bettcher | |
| 4,178,683 A * | 12/1979 | Bettcher | B26B 25/002 30/276 |
| 4,198,750 A * | 4/1980 | Bettcher | B26B 25/002 30/276 |
| 4,236,531 A | 12/1980 | McCullough | |
| 4,336,651 A * | 6/1982 | Caro | B26B 25/002 30/49 |
| 4,363,170 A * | 12/1982 | McCullough | B26B 25/002 30/276 |
| 4,422,239 A | 12/1983 | Maier et al. | |
| 4,439,924 A | 4/1984 | Bettcher | |
| 4,494,311 A * | 1/1985 | McCullough | B26B 25/002 30/276 |
| 4,509,261 A * | 4/1985 | Bettcher | B26B 25/002 30/276 |
| 4,516,323 A * | 5/1985 | Bettcher | B26B 25/002 30/276 |
| 4,575,937 A * | 3/1986 | McCullough | B26B 25/002 30/276 |
| 4,575,938 A * | 3/1986 | McCullough | B26B 25/002 30/276 |
| 4,590,576 A * | 5/1986 | Elpiner | G05D 7/0635 137/624.11 |
| 4,637,140 A | 1/1987 | Bettcher | |
| 4,854,046 A * | 8/1989 | Decker | B26B 25/002 30/264 |
| 4,858,321 A * | 8/1989 | McCullough | B26B 25/002 30/276 |
| 4,865,473 A * | 9/1989 | De Vito | F16C 33/4635 384/572 |
| 4,942,665 A * | 7/1990 | McCullough | B26B 25/002 30/276 |
| 5,031,323 A * | 7/1991 | Honsa | B25F 5/021 30/276 |
| 5,033,876 A * | 7/1991 | Kraus | F16C 19/463 384/572 |
| 5,230,154 A * | 7/1993 | Decker | B26B 25/002 16/422 |
| 5,377,411 A | 1/1995 | Andriotis | |
| 5,462,477 A * | 10/1995 | Ketels | A22C 17/004 269/22 |
| 5,499,492 A * | 3/1996 | Jameson | A01D 34/003 239/282 |
| 5,522,142 A * | 6/1996 | Whited | B26B 25/002 30/276 |
| 5,529,532 A * | 6/1996 | Desrosiers | A61C 13/12 30/276 |
| 5,582,041 A * | 12/1996 | Spiess | C14B 19/00 30/276 |
| 5,664,332 A * | 9/1997 | Whited | B26B 25/002 30/276 |
| 5,680,704 A | 10/1997 | Okubo et al. | |
| 5,924,202 A | 7/1999 | Romani | |
| 5,967,962 A * | 10/1999 | Huang | B26D 7/1863 493/199 |
| 6,013,079 A | 1/2000 | Salam | |
| 6,105,253 A | 8/2000 | Kolbert | |
| 6,219,922 B1 | 4/2001 | Campbell et al. | |
| 6,233,831 B1 | 5/2001 | Iida et al. | |
| 6,247,847 B1 * | 6/2001 | Lob | F16C 19/26 384/51 |
| 6,308,602 B1 * | 10/2001 | Gerber | B26D 5/00 83/100 |
| 6,354,949 B1 | 3/2002 | Baris et al. | |
| 6,364,086 B1 * | 4/2002 | Blaurock | F16C 33/506 193/35 MD |
| 6,413,157 B1 | 7/2002 | Marton | |
| 6,655,033 B2 | 12/2003 | Hermann et al. | |
| 6,665,940 B2 * | 12/2003 | Sanders | A01D 34/90 30/276 |
| 6,751,872 B1 * | 6/2004 | Whited | B26B 25/002 30/276 |
| 6,769,184 B1 * | 8/2004 | Whited | A22B 5/165 30/276 |
| 6,857,191 B2 | 2/2005 | Whited | |
| 6,978,548 B2 | 12/2005 | Whited et al. | |
| 7,451,791 B2 * | 11/2008 | Cooper | B25F 5/02 144/136.95 |
| 8,123,750 B2 * | 2/2012 | Norton | A61B 17/1631 606/114 |
| 8,726,524 B2 | 5/2014 | Whited et al. | |
| 8,745,881 B2 | 6/2014 | Thompson et al. | |
| 9,155,316 B2 | 10/2015 | Souli et al. | |
| 2002/0108255 A1 | 8/2002 | Degregorio, Jr. | |
| 2003/0131482 A1 * | 7/2003 | Long | A22B 5/165 30/276 |
| 2004/0088864 A1 * | 5/2004 | Whited | B26B 25/002 30/123 |
| 2004/0211067 A1 | 10/2004 | Whited et al. | |
| 2005/0217119 A1 * | 10/2005 | Rapp | A22B 5/165 30/276 |
| 2006/0037200 A1 * | 2/2006 | Rosu | B26B 25/002 30/276 |
| 2007/0283574 A1 * | 12/2007 | Levsen | A22B 5/165 30/276 |
| 2008/0022537 A1 * | 1/2008 | Clarke | B23D 45/16 30/390 |
| 2008/0098605 A1 * | 5/2008 | Whited | B26B 25/002 30/276 |
| 2010/0101097 A1 * | 4/2010 | Thien | B26B 25/002 30/276 |
| 2010/0170097 A1 * | 7/2010 | Levsen | A22B 5/165 30/276 |
| 2011/0023674 A1 * | 2/2011 | Stasiewicz | B23D 59/006 83/112 |
| 2011/0185580 A1 * | 8/2011 | Whited | B26B 25/002 30/276 |
| 2011/0247220 A1 * | 10/2011 | Whited | B26B 25/002 30/276 |
| 2013/0087029 A1 * | 4/2013 | Iyatani | B26D 1/245 83/13 |
| 2013/0104336 A1 * | 5/2013 | Duan | B28D 7/02 15/415.1 |
| 2015/0183130 A1 * | 7/2015 | Gadd | B24B 55/02 83/100 |
| 2015/0224666 A1 * | 8/2015 | Lin | B23D 59/006 83/100 |
| 2016/0031103 A1 * | 2/2016 | Mascari | B26D 7/1863 30/124 |

FOREIGN PATENT DOCUMENTS

| | | |
|---|---|---|
| DE | 10217195 C1 | 10/2003 |
| EP | 1226907 A2 | 7/2002 |

* cited by examiner

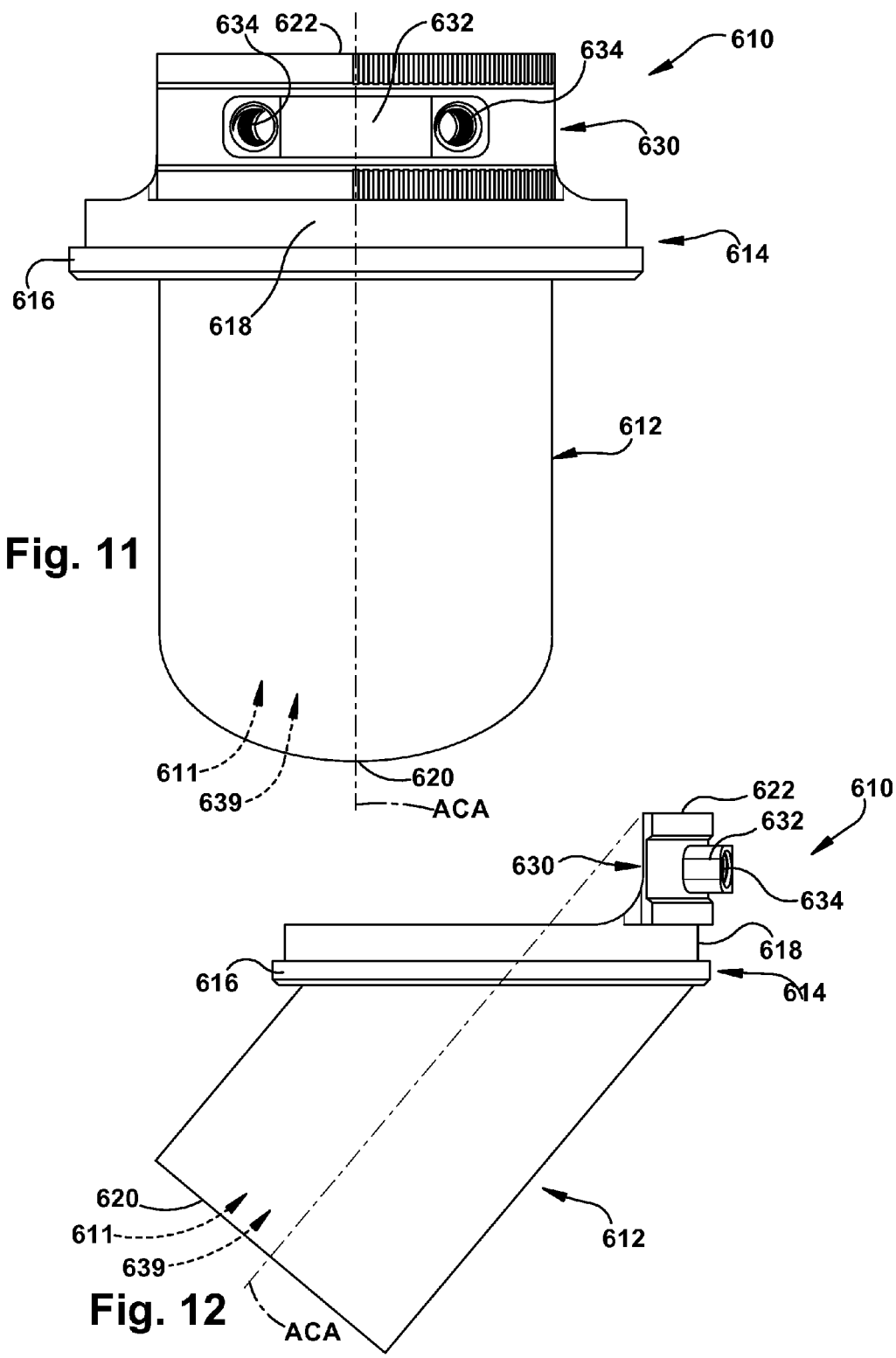

POWER OPERATED ROTARY KNIFE WITH VACUUM ATTACHMENT ASSEMBLY

CROSS-REFERENCE TO RELATED APPLICATION

The present application is a continuation-in-part application of co-pending U.S. application Ser. No. 14/446,005, filed Jul. 29, 2014 and entitled POWER OPERATED ROTARY KNIFE WITH VACUUM ATTACHMENT ASSEMBLY. The present application claims priority from above-identified application Ser. No. 14/446,005, which is incorporated herein in its entirety by reference, for all purposes.

TECHNICAL FIELD

The present disclosure relates to a power operated rotary knife and, more specifically, to a power operated rotary knife with a vacuum attachment assembly.

BACKGROUND

Power operated rotary knives are widely used in meat processing facilities for meat cutting and trimming operations where it is desired to remove material, for example, a layer of fat, from a product, for example, an untrimmed piece of meat. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy and cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary knife blade of a conventional power operated rotary knife defines a closed loop cutting surface for cutting or trimming material from a product wherein the rotating blade contacts and cuts the material, thereby removing the material from the product. The cut or trimmed material moves away from a cutting edge at one end of the rotary knife blade. An inner wall of the rotary knife blade defines a central, open region of the blade. The cut or trimmed material moves away from the cutting edge, travels or traverses along the inner wall and through the central, open region of the blade before exiting the blade at an end opposite the cutting edge.

The rotary knife blade is typically rotated by a drive assembly which may include a pneumatic or electric motor disposed in an opening or throughbore defined by handle assembly. The pneumatic or electric motor may include a drive shaft that engages and rotates a pinion gear supported by the head assembly. The pinion gear, in turn, engages and rotatably drives the annular rotary knife blade. Gear teeth of the pinion gear engage mating gear teeth formed on an upper surface of the rotary knife blade to rotate the blade. Alternatively, the drive assembly may include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft. The shaft drive assembly is coupled to and driven by a pneumatic or electric motor which is remote from the handle assembly.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Conventional power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., and U.S. Pat. No. 8,726,534 to Whited et al., all of which are assigned to the assignee of the present disclosure and all of which are incorporated herein in their respective entireties by reference.

When material is cut or trimmed by a rotary knife blade, the removed material (that is, the cut or trimmed material) moves or travels away from a cutting edge of the blade and through the central, open region defined by the knife blade inner wall and exits the opposite end of the rotary knife blade. Upon exiting the rotary knife blade, the removed material will, depending on the position of the power operated rotary knife and the product, either fall back upon a trimmed or an untrimmed portion of the product being cut or trimmed or fall to a surface a workstation where the cutting or trimming operation is being performed. For certain applications, it may be desirable to have a vacuum attachment to a power operated rotary knife to remove, via suction, the removed material such that the removed material does not fall onto the product or fall to the work station surface, but instead is routed away from trimmed product after being cut or trimmed from the product. In certain cutting or trimming operations, the removed material is undesirable and it is desired to immediately physically separate the removed material from the product, for example, if the removed material is unwanted fat tissue to be removed from a steer carcass during a hot defatting process or a contaminated/bruised tissue region of a poultry or pig carcass, it would be desirable to use suction to route the removed/unwanted tissue from the carcass immediately upon cutting or trimming the unwanted tissue to a collection receptacle for disposal purposes and/or to avoid contamination of the carcass by the removed tissue. On the other hand, in certain cutting or trimming operations, the removed material is highly desirable or valuable. Again, the suction of a vacuum attachment will route the desirable removed tissue or removed material to a collection receptacle for collection of the desirable removed material or tissue.

Power operated rotary knives including vacuum attachments are disclosed in, for example, U.S. Pat. No. 6,857,191 to Whited et al. and U.S. Published Application No. US 2004/0211067 to Whited et al., both of which are assigned to the assignee of the present disclosure.

SUMMARY

In one aspect, the present disclosure relates a power operated rotary knife comprising: a handle assembly including an elongated cylindrical handle housing defining a handle assembly longitudinal axis extending through a throughbore in the handle housing; a head assembly coupled to and extending from a distal end of the handle assembly, the head assembly including a rotary knife blade supported by a blade housing for rotation about a central axis of rotation, the rotary knife blade including an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body, and a blade section adjacent a second end of the annular body, the head assembly further including a frame securing the blade housing to the distal end of the handle assembly in a position radially offset from the handle housing such that the central axis of rotation of the rotary knife blade is spaced apart from and is substantially parallel to the handle longitudinal axis; and a vacuum attachment assembly including a vacuum adapter and a vacuum hose, the vacuum adapter including an adapter body having an inner wall defining a central open region extending from a first end to a spaced apart second end of the adapter body, the first end of the vacuum adapter secured to the vacuum hose and the second end of the vacuum adapter including a housing clamp secured to the blade housing, the adapter body defining an adapter central axis extending through the central open region and the central open region being in fluid communication with the central open region of the annular body of the rotary knife blade, the adapter body extending at an angle away from the handle housing such that the adapter central axis is transverse with respect to the central axis of rotation of the rotary knife blade and the handle assembly longitudinal axis.

In another aspect, the present disclosure relates to an annular rotary knife blade for rotation about a central axis of rotation in a power operated rotary knife, the rotary knife blade comprising: an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body and a radially inwardly extending bearing race axially spaced from the driven gear, the bearing race defining first and second axially spaced apart bearing faces, a blade section adjacent a second end of the annular body, and a spacer section intermediate the drive section adjacent the first end of the annular body and the blade section adjacent the second end of the annular body, wherein a maximum outer diameter of the spacer section of the rotary knife blade is smaller than a minimum outer diameter of the drive section and a maximum outer diameter of the blade section is smaller than the minimum outer diameter of the drive section.

In another aspect, the present disclosure relates to a power operated rotary knife comprising: an elongated handle assembly defining a handle assembly longitudinal axis; a head assembly coupled to and extending from a distal end of the handle assembly, the head assembly including a rotary knife blade supported by a blade housing for rotation about a central axis of rotation, the rotary knife blade including an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body, and a blade section adjacent a second end of the annular body, the head assembly further including a frame, the blade housing and handle assembly releasably coupled to the frame, the blade housing being radially offset from the handle assembly longitudinal axis such that the central axis of rotation of the rotary knife blade is spaced apart from and is substantially parallel to the handle assembly longitudinal axis; and a vacuum attachment assembly including a vacuum adapter and a vacuum hose, the vacuum adapter having a proximal end and an axially spaced apart distal end, an inner wall defining a central open region of the vacuum adapter extending from the proximal end to the distal end, the open central region of the vacuum adapter defining an adapter central axis and being in fluid communication with the central open region of the annular body of the rotary knife blade, the vacuum hose secured to the proximal end of the vacuum adapter, the distal end of the vacuum adapter including a housing clamp coupled to the frame with the blade housing secured between the housing clamp and the frame, the adapter central axis extending substantially parallel to the central axis of rotation of the rotary knife blade.

In another aspect the present disclosure relates to a head assembly for a power operated rotary knife comprising: a rotary knife blade and a blade housing, the rotary knife blade supported by the blade housing for rotation about a central axis of rotation, the rotary knife blade including an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body, and a blade section adjacent a second end of the annular body; a frame releasably supporting the blade housing; and a vacuum attachment assembly including a vacuum adapter and a vacuum hose, the vacuum adapter having a proximal end and an axially spaced apart distal end, an inner wall defining a central open region of the vacuum adapter extending from the proximal end to the distal end, the open central region of the vacuum adapter defining an adapter central axis and being in fluid communication with the central open region of the annular body of the rotary knife blade, the vacuum hose secured to the proximal end of the vacuum adapter, the distal end of the vacuum adapter including a housing clamp coupled to the frame with the blade housing secured between the housing clamp and the frame, the adapter central axis extending substantially parallel to the central axis of rotation of the rotary knife blade.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 11 is a schematic side elevation view of a vacuum adapter of a vacuum attachment assembly of the power operated rotary knife of FIG. 1;

FIG. 12 is a schematic front elevation view of a vacuum adapter of FIG. 11; and

DETAILED DESCRIPTION

Power Operated Rotary Knife 100

Overview

Figure 1:
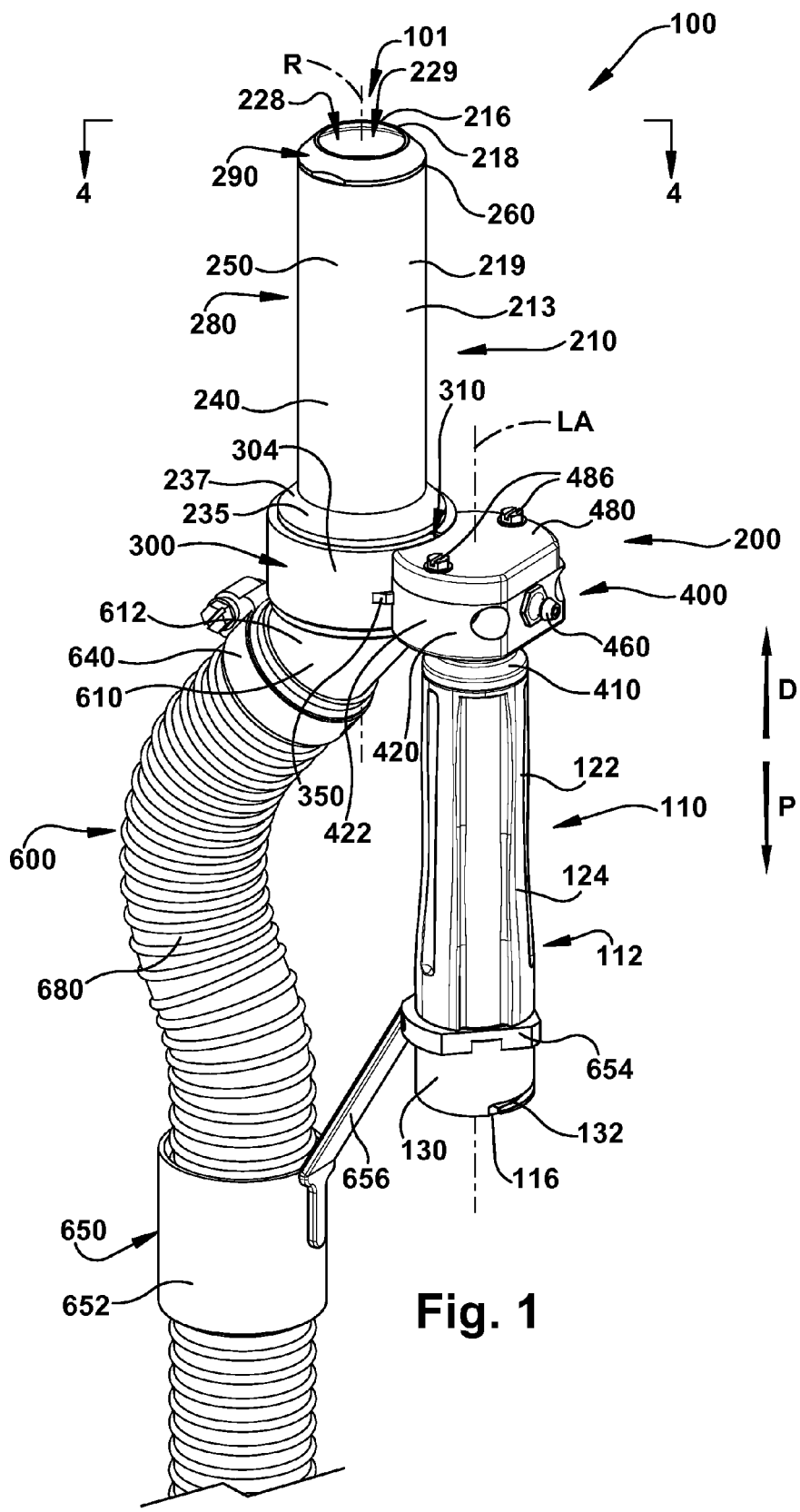
FIG. 1 is a schematic front perspective view of a first exemplary embodiment of a power operated rotary knife of the present disclosure including a handle assembly, a head assembly, and a vacuum attachment assembly.
Figure 2:
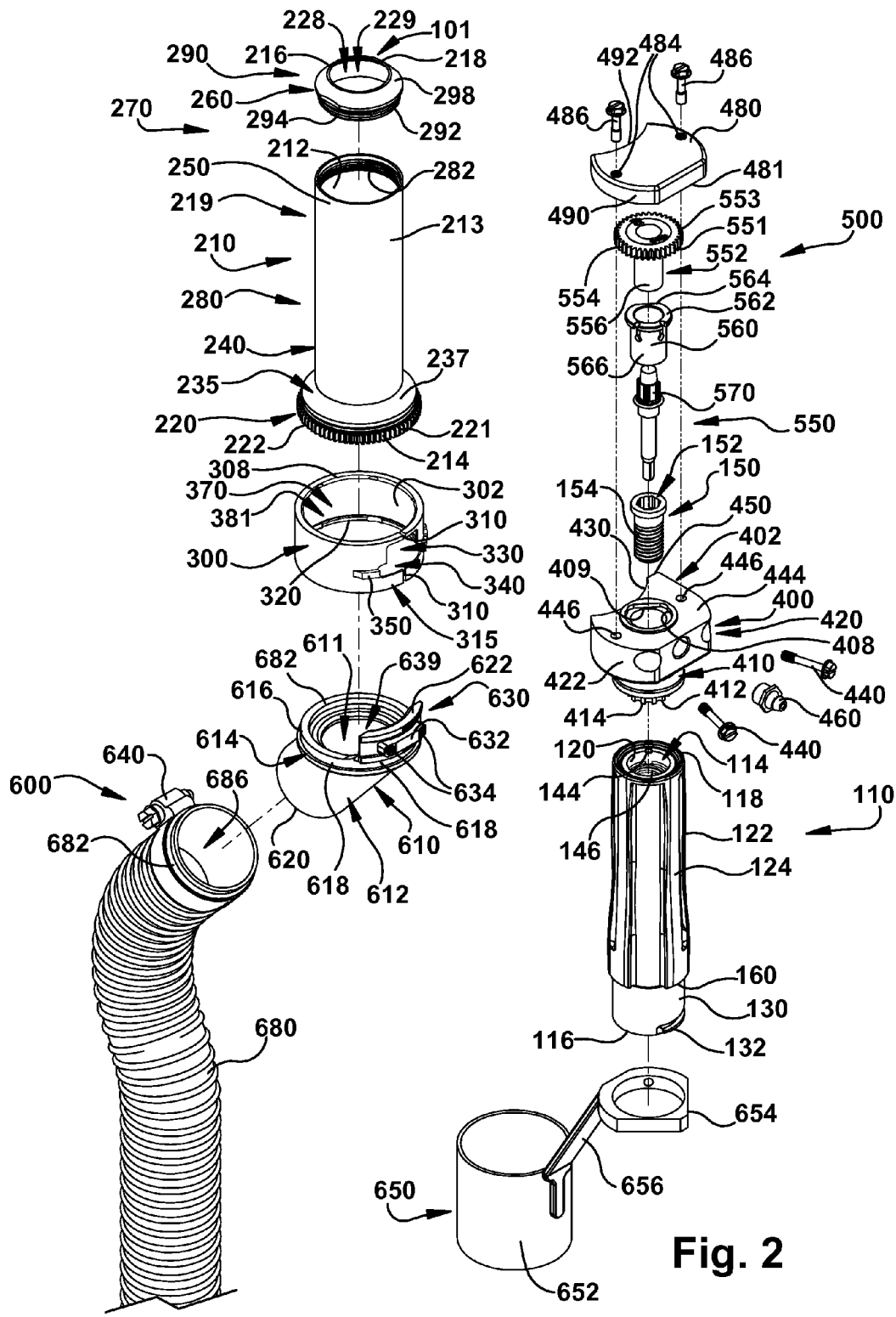
FIG. 2 is a schematic exploded perspective view of the power operated rotary knife of FIG. 1.

The present disclosure pertains to a power operated rotary knife comprising a head assembly, including an elongated, annular rotary knife blade, a handle assembly, and a vacuum attachment assembly for routing removed material, that is material cut or trimmed by the rotary knife blade from a cutting region of a product, via vacuum pressure, away from the cutting region of the product and away from the rotary knife blade such that the removed material does not have to be manually collected or removed from the cutting region by the operator. The vacuum attachment assembly includes a vacuum hose and a vacuum adapter that couples a vacuum hose to the head assembly of the power operated rotary knife.

Advantageously, the elongated, annular rotary knife blade of the power operated rotary knife includes a cylindrical spacer section disposed between a drive section and a blade section of the knife which substantially elongates the rotary knife blade. The elongated configuration of the rotary knife blade facilitates the operator extend a cutting edge of the rotary knife blade into an narrow interior region of a product (e.g., an abdominal cavity of a carcass) for the purpose of trimming or cutting material from the product that otherwise would be difficult to access with a conventional power operated rotary knife and/or conventional by-hand cutting instruments such as long knives, scissor, nippers, etc. Advantageously, because of the extended length or reach of the rotary knife blade with respect to the gripping portion of the handle assembly, the operator does not have to reach as far into the abdominal cavity of the carcass.

Further, as the spacer and blade sections of the rotary knife blade are of reduced diameter compared to the drive section, a distally extending region of the rotary knife blade has a reduced diameter, as compared to the drive section. The reduced diameter distally extending region and a longitudinal extent of the spacer section further facilitates ease of insertion of the blade into a narrow interior region of the product and manipulation of the cutting edge to cut or trim material from the product. Additionally, the reduced diameter distally extending region of the rotary knife blade reduces drag of the rotary knife blade due to the smaller diameter while maintaining the mechanical advantage resulting from having a larger diameter driven gear in the drive section of the rotary knife blade.

For example, it is desirable in hot defatting operations involving carcasses of larger animals such as steers or pigs to remove certain pockets of fatty tissue that are located between the rib cage and the respective front legs of the carcass. Presently, an operator removes these pockets of fatty tissue when the carcass is hanging vertically with the abdominal cavity cut open. The operator, while holding a cutting instrument in his or her hand, reaches his or her hand into the opened abdominal cavity, and appropriately moves his or hand and the cutting instrument while attempting to locate the pocket of fatty tissue, once the pocket of fatty tissue is located, the operator manipulates the cutting instrument to repeatedly cut portions of the pocket of fatty tissue away from the carcass, the trimmed portions of the fatty tissue falling downwardly within the abdominal cavity and/or to the workstation floor. When the pocket of fatty tissue has been substantially completely cut away from the carcass, the operator repeats the process for the second fatty pocket located between the rib cage and the other front leg. Finally, the removed portions of the two cut-away pockets of fatty tissue must be removed from the abdominal cavity and/or the workstation floor. This is a difficult, time-consuming, labor intensive operation or task for the operator. Adding to the difficulty is the fact that the operator cannot readily see where or what he or she is cutting within the far recesses of the opened abdominal cavity and the operator's arm must be extended sufficiently such that the cutting instrument can reach and cut into the fatty tissue pocket.

With the power operated rotary knife of the present disclosure, this labor intensive task is greatly simplified leading to less time consumed and reduced operator fatigue. The extended length or reach of the rotary knife blade resulting from the spacer portion, with respect to the gripping portion of the handle assembly, means that the operator does not have to reach as far into the abdominal cavity of the carcass. Moreover, in the power operated rotary knife of the present disclosure, a longitudinal axis of a generally cylindrical handle assembly is parallel to but is spaced offset from an axis of rotation of the rotary the annular rotary knife blade. This configuration of the power operated rotary knife blade advantageously allows the operator to more easily reach deep into the abdominal cavity of a carcass and make a plunging or forward-reaching type cut to remove tissue to be removed. Additionally, the high rotational speed of the rotary knife blade makes the actual cutting of the pocket of fatty tissue away from the carcass much easier.

Further, the vacuum attachment assembly of the power operated rotary knife of the present disclosure includes a vacuum adapter that coupled a vacuum hose to a lower end of an annular blade housing. The vacuum adapter is configured so as to space the vacuum hose from the operator's fingers as the operator is gripping the gripping portion of the handle assembly. This advantageously provides clearance for the operator's finger and facilitates ease of manipulation of the power operated rotary knife by the operator to make the forward reaching or plunging type of cut. Additionally, the vacuum attachment assembly is configured such that the vacuum hose extends substantially parallel to the longitudinal axis of the handle assembly. In this way, the handle assembly, rotary knife blade and vacuum hose provide a smaller frontal profile when the power operated rotary knife is being extend within a narrow passageway defined by, for example, an abdominal cavity. Stated another way, if the vacuum hose extended orthogonally from the handle assembly, such a configuration would provide a much larger frontal profile. Thus, it would make it more difficult for the operator to move the power operated rotary knife forward deep into a narrow portion of the abdominal cavity because the orthogonally extending hose would be hitting against the sides of the abdominal cavity as the power operated rotary knife was being moved forward. Finally, the suction provided through the vacuum hose of the vacuum attachment assembly facilitates immediate collection of removed material (removed tissue) from a product (animal carcass). That is, the removed tissue is prevented from falling onto the carcass or onto a surface of a workstation where the carcass is position. This mitigates contamination of the removed material, contamination of the trimmed product and also frees the operator from the task of collecting and or moving the removed material from the trimmed product.

First Exemplary Embodiment—Power Operated Rotary Knife 100

Turning to the drawings, a first exemplary embodiment of a power operated rotary knife of the present invention is generally shown at 100 in FIGS. 1-4. The power operated rotary knife 100 includes a elongated handle assembly 110, a head assembly 200 releasably coupled to and extending from a distal end 118 of the handle assembly 110 and the vacuum attachment assembly 600 releasably coupled to a proximal end 306 of a blade housing 300 of the head assembly 200. The power operated rotary knife 100 additionally includes a drive mechanism 500 that is coupled to an annular rotary knife blade 210 of the head assembly 200 and provides motive power to rotate the rotary knife blade 210 with respect to the blade housing 300 about a blade central axis of rotation R. In one exemplary embodiment, the drive mechanism 500 includes a pneumatic motor 510 and a drive train 550 to couple the rotational force of a rotating output shaft 512 of the pneumatic motor 510 to rotate the rotary knife blade 210.

Figure 3:
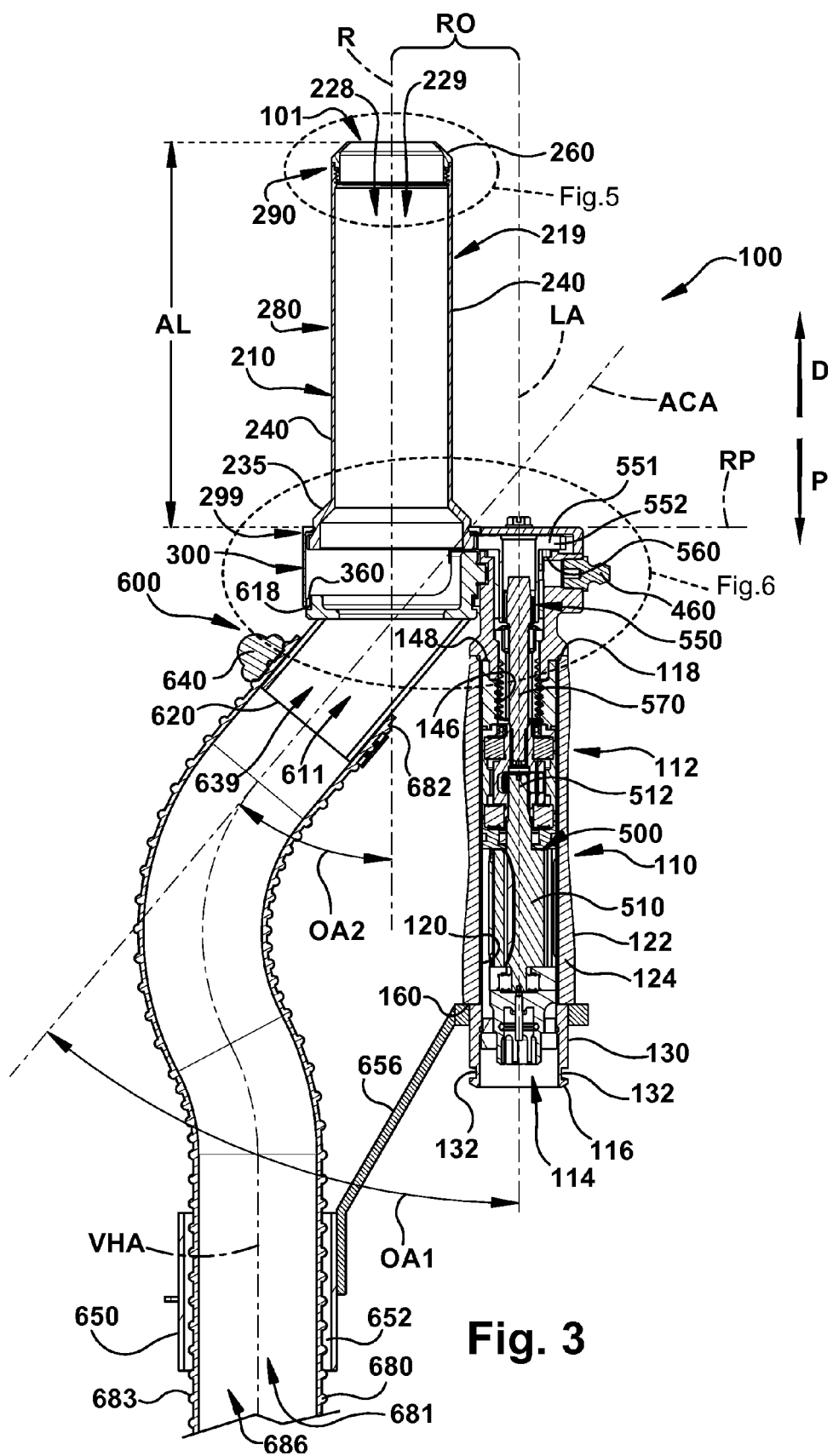
FIG. 3 is a schematic longitudinal section view of the power operated rotary knife of FIG. 1 taken along a longitudinal axis of the handle assembly.
Figure 4:
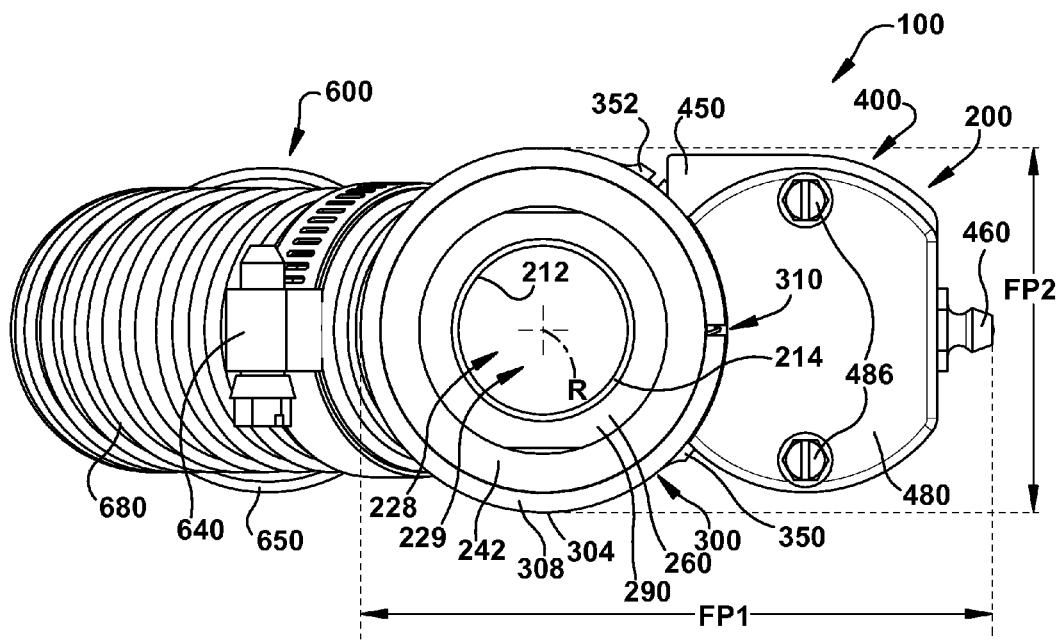
FIG. 4 is a schematic top plan view of the power operated rotary knife of FIG. 1.
Figure 5:
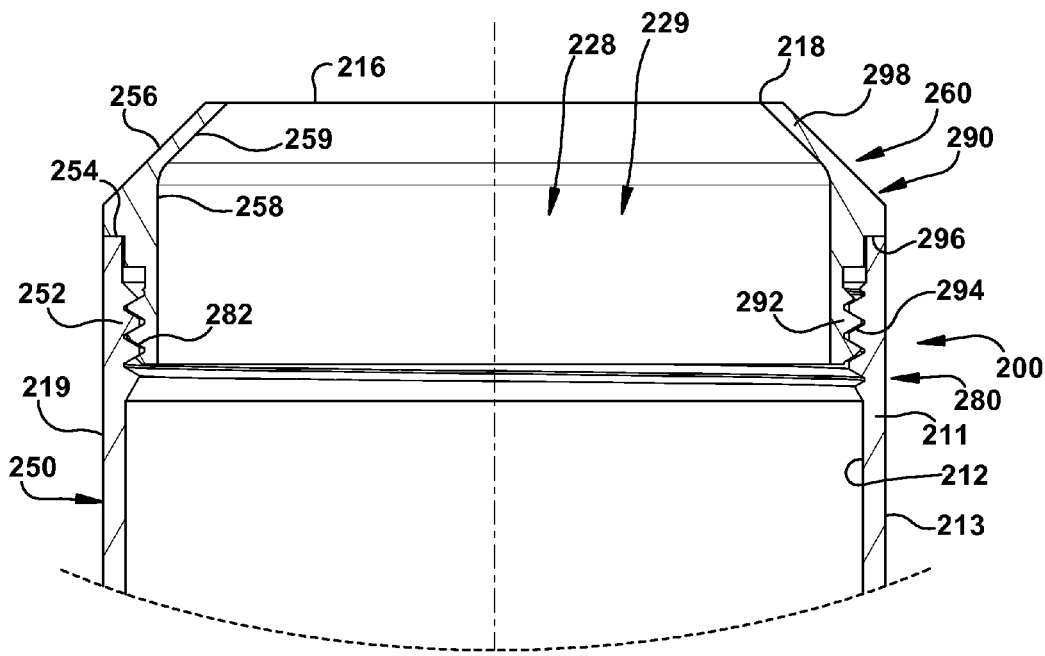
FIG. 5 is a schematic enlarged section view of portions of the power operated rotary knife of FIG. 1 that are within a dashed circle labeled FIG. 5 in FIG. 3.

As can best be seen in FIG. 3, the handle assembly 110 includes an elongated, generally cylindrical handle housing 112 defining a central, longitudinally extending throughbore 114 that extends from a first, proximal or rearward end 116 of the handle assembly 110 to the second, distal or forward end 118 of the handle assembly 110. In one exemplary embodiment, the drive mechanism pneumatic motor 510 is disposed within the throughbore 114 of the handle housing 112. A central longitudinal axis LA of the handle assembly 110 extends through the handle assembly throughbore 114.

Figure 7:
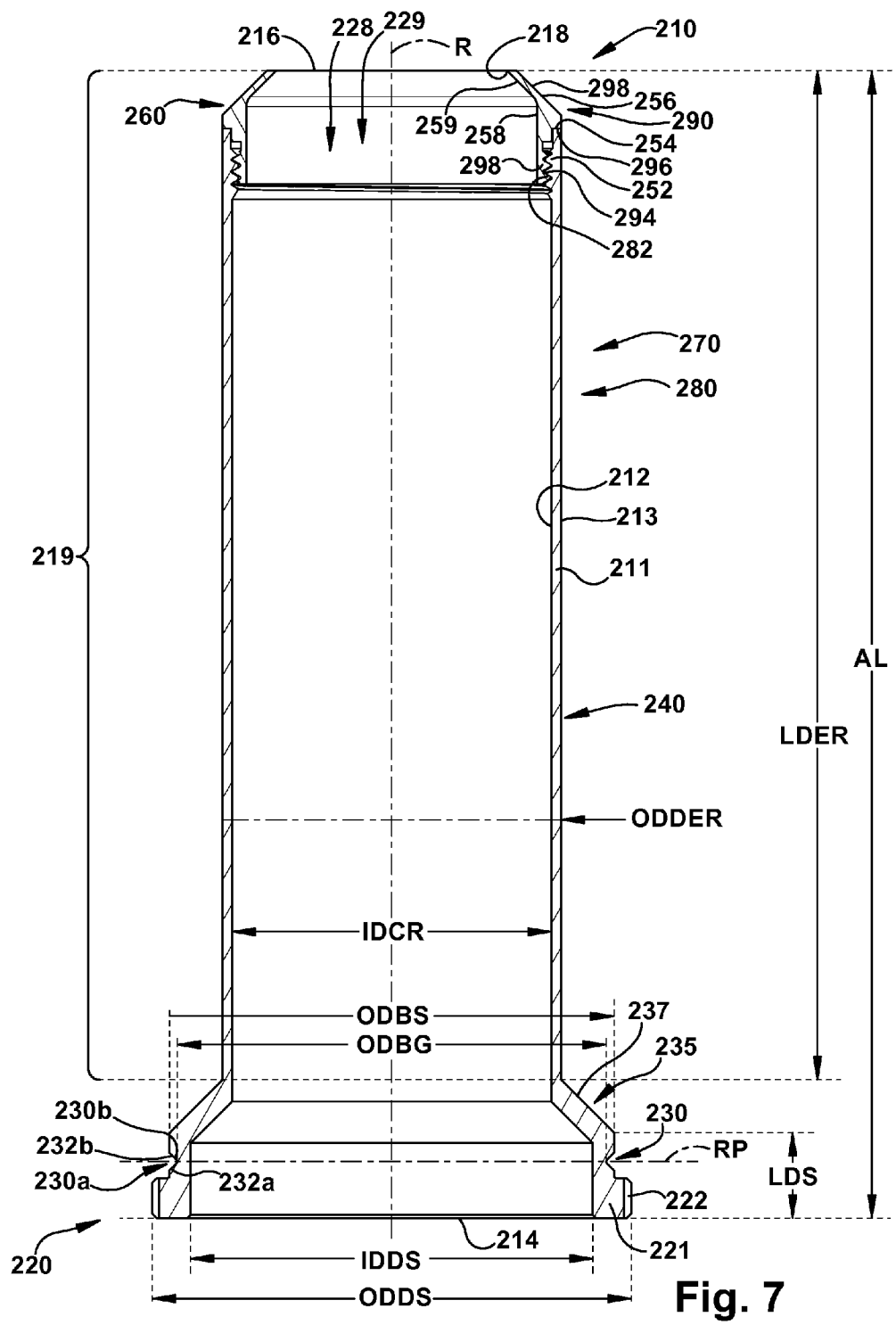
FIG. 7 is a schematic section view of an annular rotary knife blade of a head assembly of the power operated rotary knife blade of FIG. 1.
Figure 8:
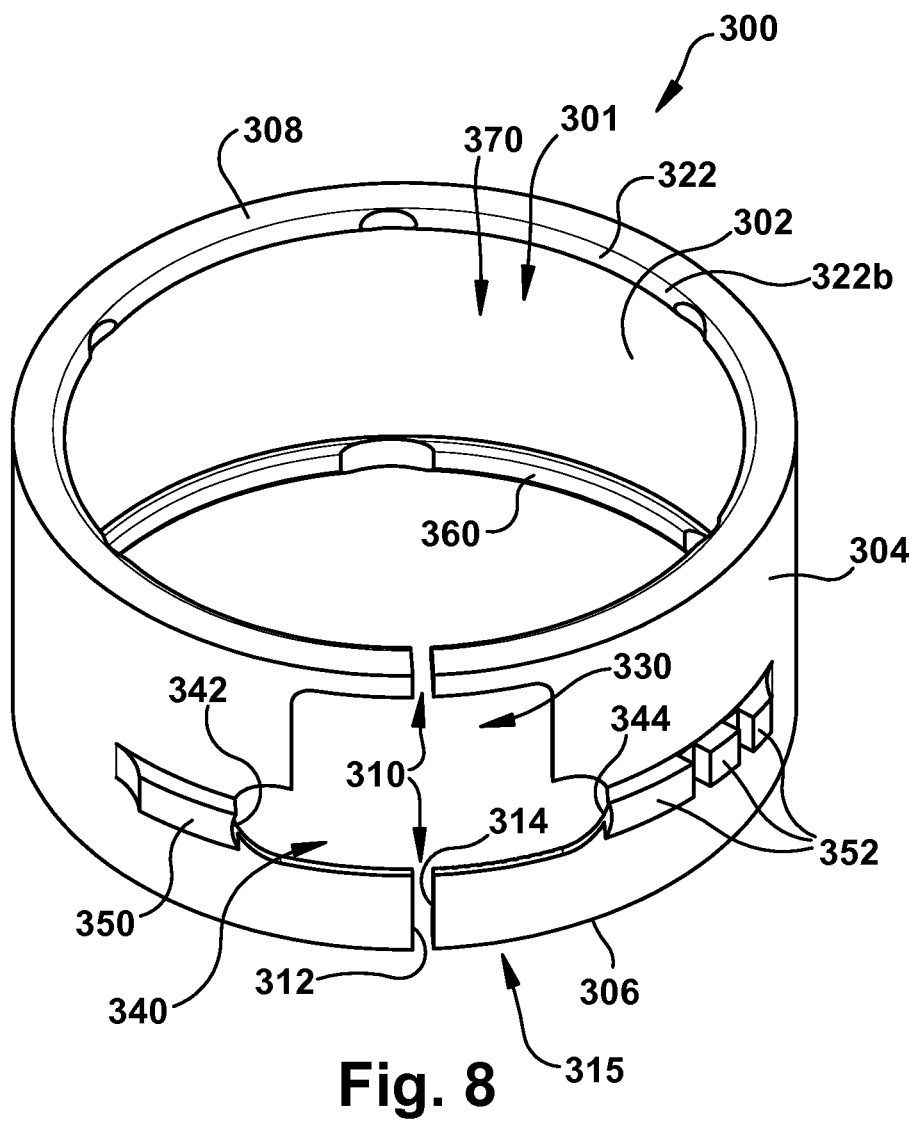
FIG. 8 is a schematic front perspective view of an annular blade housing of a head assembly of the power operated rotary knife blade of FIG. 1.

The head assembly 200 includes the annular rotary knife blade 210 (FIG. 7) rotatably supported by the blade housing 300 (FIG. 8). The head assembly 200 further includes a frame or frame body 400 (FIG. 9) which supports the rotary knife blade 210 and the blade housing 300 and, in turn, is releasably coupled to the handle assembly 110. The frame 400 includes a proximal cylindrical base 410 and an enlarged distal head 420. A throughbore 402 extends through the frame 400 and is aligned with the handle assembly throughbore 114 along the handle assembly longitudinal axis LA. The enlarged head 420 of the frame includes an arcuate mounting region 430 that provides a seating region for a mounting region 315 of the blade housing 300. The arcuate mounting region 430 includes a slotted recess 432 that receives a radially extending tongue 632 of a housing clamp 630 of a vacuum adapter 610 of the vacuum attachment assembly 600 to releasably secure the adapter 610 and the blade housing 300 to the frame 400.

The vacuum attachment assembly 600 includes a vacuum hose 680 and the vacuum adapter 610 which couples the vacuum hose 680 to the proximal end 306 of the blade housing 300. An interior region 686 of defined by the vacuum hose 680 is in fluid communication with respective interior regions 228, 301 of the rotary knife blade 210 and the blade housing 300. The rotary knife blade interior region 228 and the blade housing interior region 301 are defined by aligned throughbores 229, 370 of the knife blade 210 and blade housing 300. Vacuum pressure drawn in the vacuum hose interior region 686 is communicated through the rotary knife blade interior region 228 and the blade housing interior region 301 such that removed material cut by the rotary knife blade 210 flows or is routed from a distal cutting edge 218 of the rotary knife blade 210 though the interior regions 228, 301 of the rotary knife blade and blade housing 210, 300 and into the vacuum hose interior region 686. The removed material accumulates in a container (not shown) at a proximal end of the vacuum hose 680.

Handle Assembly 110

As can best be seen in FIGS. 1-3 and 6, the handle assembly 110 includes the cylindrical handle housing 112. The handle housing includes an inner wall 120 defining the central longitudinally extending throughbore 114 and a radially spaced apart outer wall 122. The handle housing 112 also defines the central longitudinal axis LA of the handle assembly 110 that extends centrally through the throughbore 114. The outer wall 122, in a region extending rearwardly from the distal end 118 of the handle assembly 110 includes a ribbed, contoured handle grip 124 which is grasped by the operator to manipulate the power operated rotary knife 100 during cutting or trimming operations. Extending forwardly from the proximal end 116 of the handle housing 112 is a coupling collar 130 which receives an air supply coupling (not shown) to releasably connect an air hose supplying compressed air to drive the pneumatic motor 510. The coupling collar 130 includes a pair of grooves 132 in the outer wall 122 to lock in mating projections of the air supply coupling.

The handle housing 112 includes a frame attachment collar 140 at the distal end 118 of the handle assembly 110. The collar 140 includes a recessed opening 142 with a radially inwardly, longitudinally extending rib 144. The recessed opening 142 of the collar 140, which defines a portion of the throughbore 114 of the handle assembly 110 and the inner wall 120 of the handle housing 120, receives a splined proximal region 412 of the cylindrical base 410 of the frame 400, when the head assembly 200 and, specifically, the frame 400 is assembled or releasably coupled to the handle assembly 110. The rib 144 interfits with a selected one of a plurality of splines 414 of the splined proximal region 412 to allow the operator to select a desired angular or circumferential orientation between the frame 400 and the contoured handle grip 124 that is most comfortable for the operator. Once the desired orientation between the frame 400 and the handle grip 124 is selected, the handle assembly collar 140 is pushed in a distal direction D (FIGS. 1 and 3) onto the splined proximal region 412 of the frame 400 and the engagement or interfit between the rib 144 and the selected spline of the plurality of splines 414 prevents relative rotation between the frame 400 and the handle assembly 110.

Proximal to the recessed opening 142 of the collar 140 is a threaded region 146 defining a portion of the inner wall 120 of the handle housing 112. A threaded cylindrical fastener 150 includes a throughpassage 152 with a threaded outer wall portion 154 and an exterior shoulder 156. The fastener 150 is inserted through the throughbore 402 of the frame 400 and the threaded outer wall portion 154 threads into the threaded region 146 of the handle housing collar 140 to secure the frame 400 to the handle assembly 100. The exterior shoulder 156 of the fastener 150 abuts and bears against an interior shoulder 406 formed on the inner wall 404 of the frame 400 when the fastener 150 is fully tightened into the collar 140 to affix the frame 400 to the handle assembly 110. Additionally, an annular upper surface 148 (best seen in FIG. 6) of the collar 140 abuts and bears against a mating annular shoulder 407 of the a cylindrical base 410 of the frame 400 surrounding the splined proximal region 412 when the fastener 150 is fully tightened into the collar 140 to affix the frame 400 to the handle assembly 110. The throughpassage 152 of the fastener 150 is aligned with the handle assembly longitudinal axis LA and a drive adapter 570 of the drive train 550 of the drive mechanism extends through the throughpassage 152 to provide a rotating coupling between the output shaft 512 of the pneumatic motor 510 and a pinion gear 552 supported in the throughbore 402 of the frame 400.

Drive Mechanism 500

The drive mechanism 500 rotates the rotary knife blade 210 with respect to the blade housing 300 at a high rotational speed (on the order of 900-1900 RPM) about the central axis of rotation R. The drive mechanism 500, in one exemplary embodiment, includes the pneumatic or air motor 510 disposed within the throughbore 114 of the handle housing 112 and the drive train 550 which is partially disposed within the central opening or throughbore 402 of the frame 400. The throughbore 402 of the frame 400 is defined by an inner wall 404 of the frame 400 and is longitudinally aligned with the handle assembly throughbore 114 and the longitudinal axis LA.

Figure 6:
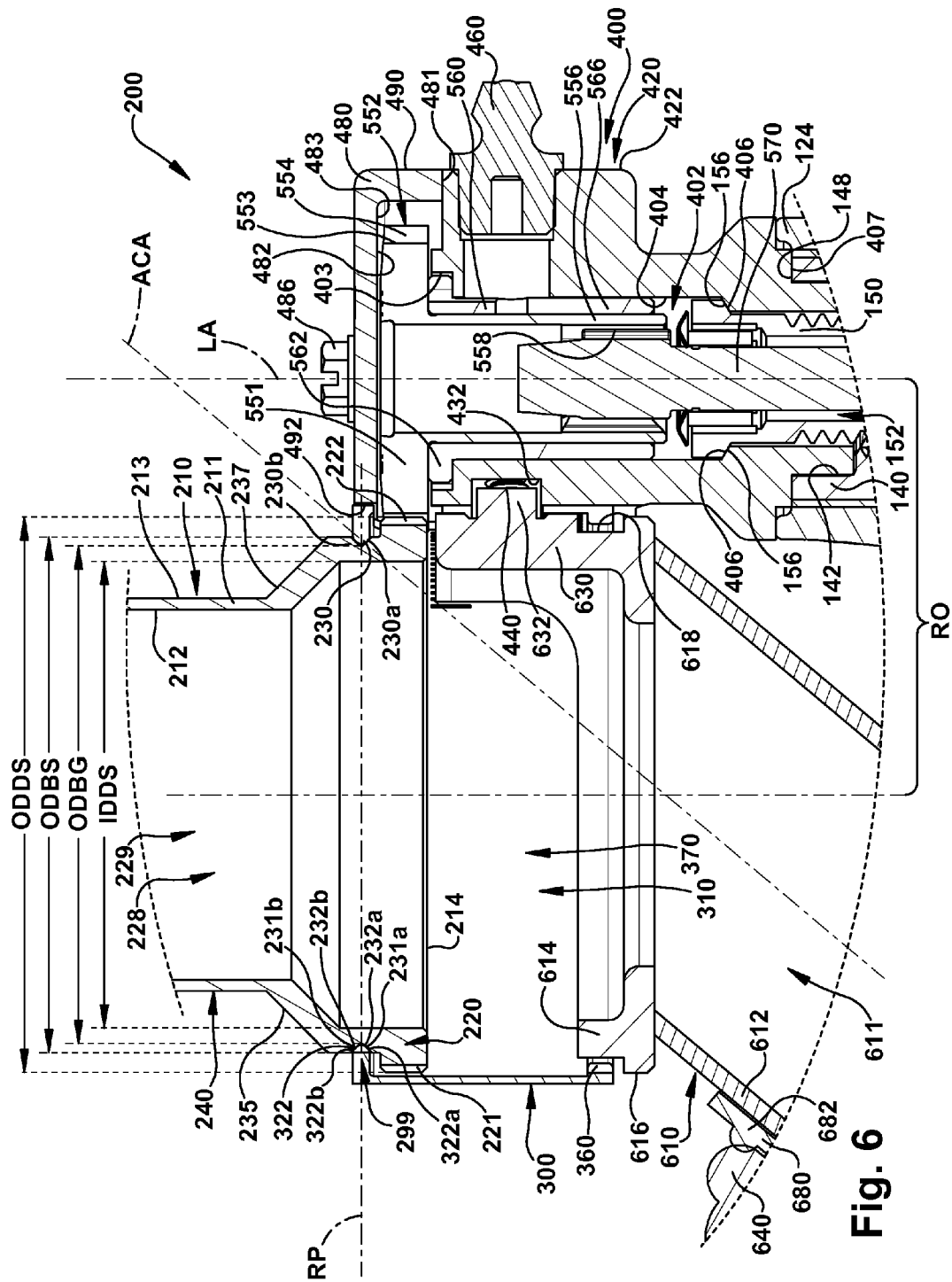
FIG. 6 is a schematic enlarged section view of portions of the power operated rotary knife of FIG. 1 that are within a dashed circle labeled FIG. 6 in FIG. 3.

In one exemplary embodiment, the drive train 550 includes the pinion gear 552, supported for rotation in a pinion gear bushing 560 positioned in the frame throughbore 402 and the drive adapter 570. As best seen in FIGS. 3 and 6, the drive adapter 570 extends from the motor output shaft 512 to the pinion gear 552 through the handle assembly throughbore 114 and through the throughpassage 152 of the handle assembly fastener 150 and into the throughbore 402 of the frame 400.

The pinion gear 552 is driven by the drive adapter 570 extending distally from the output shaft 512 of the pneumatic motor 510. A distal end of the drive adapter 570 is received in a pinion gear drive coupling 558 defined by a rearwardly extending tubular shank 556 of the pinion gear 552. The pinion gear 552 includes an enlarged distal head 551 defining a drive gear 553 comprising a set of involute spur gear teeth 554. The spur gear teeth 554 engage the mating set of involute spur gear teeth 222 of the driven gear 221 of the drive section 220 of the rotary knife blade 210 to rotate the blade 210 about the axis of rotation R.

As would be understood by one of skill in the art, it should be understood that other drive mechanisms may be utilized to drive the rotary knife blade 210, for example, a DC motor disposed in the throughbore 114 of the handle assembly 110 could be used in place of the pneumatic motor 510. Alternatively, a flexible shaft drive assembly extending through the throughbore 114 of the handle assembly 110 could be used to drive the rotary knife blade. The flexible shaft drive assembly could, for example, include a stationary outer sheath and a rotatable interior drive shaft that is driven by a remote pneumatic or electric motor. Such alternative drive mechanisms are contemplated by the present disclosure.

Head Assembly 200

The head assembly 200 includes the annular rotary knife blade 210 (FIG. 7) rotatably supported for rotation about the central axis of rotation R by the blade housing 300 (FIG. 8). The head assembly 200 also includes the frame or frame body 400 (FIG. 9) which supports the rotary knife blade 210 and the blade housing 300 and, in turn, is releasably coupled to the handle assembly 110. The arcuate mounting region 420 of the enlarged head 420 of the frame 400 also supports the vacuum adapter 610 of the vacuum attachment assembly 600 via a fastener interconnection between the housing clamp 630 of the adapter 610 and the frame enlarged head 420. The frame also supports a pinion gear 552 of the drive train 550 of the drive mechanism 500.

Annular Rotary Knife Blade 210

As can best be seen in FIG. 7, the annular rotary knife blade 210 includes a generally cylindrical annular body 211. The annular body 211 of the rotary knife blade 210 includes an inner wall 212 and a radially spaced apart outer wall 213 and extends from a first, proximal end 214 and a second, distal end 216, which defines the cutting edge 218 of the blade. The annular body 211 of the rotary knife blade 210 includes an annular drive section 220, adjacent the proximal end 214 of the blade 210, an intermediate, elongated spacer section 240, and a blade section 260, adjacent the distal end 216 of the blade 210. A tapered transition section 235 extends between the drive section 220 and the spacer section 240. The tapered transition section 235 defines a necked-down tapered region 237 that transitions from a larger diameter of the annular drive section 220 to a smaller diameter of a spacer section 240 and a smaller diameter blade section 260. The spacer section 240 and the blade section 210 define a distally extending region 219 of the rotary knife blade 210.

Advantageously, the annular blade section 260 and the annular spacer section 240 have a reduced outer diameter compared with an outer diameter of the drive section 220. The reduced outer diameter of the blade and spacer sections 260, 240 affords reduced drag and ease of manipulation and position of a distally extending region 219 of the rotary knife blade 210 which is likely to contact the product during cutting and trimming operations. For example, the reduced outer diameter of the distally extending region 219 (blade and spacer sections 260, 240) of the rotary knife blade 210 is advantageous for reduced drag and ease of manipulation, for example, when the power operated rotary knife 100 is inserted into an abdominal cavity of a carcass and the distally extending region 219 of the blade 210 is moved forward into a narrow portion of the abdominal cavity to remove a pocket of fat tissue disposed between the rib cage and a front leg of the carcass. Further, the larger outer diameter of the drive section 220, which allows for a diameter of a driven gear 221 formed on the outer wall 213 of the annular body 211 to be larger, as compared to the distally extending region 219, thereby providing a mechanical advantage with respect to rotatably driving the blade 210 versus a smaller driven gear diameter.

The drive section 220 of the rotary knife blade 210 defines the driven gear 221 comprising a set of involute spur gear teeth 222 extending from the outer wall 213 for rotatably driving the blade 210 about its central axis of rotation R. The drive section 220 further includes a radially inwardly extending generally V-shaped bearing groove or bearing race 230, also formed by the outer wall 213 of the rotary knife blade 210, which is axially spaced from and distal to the gear teeth 222. The bearing groove 230 interfits with a bearing bead 320 of the blade housing 300 defining a bearing structure 299 for rotatably supporting the blade 210 for rotation about the axis of rotation R. The bearing structure 299 defines a rotational plane RP of the rotary knife blade 210 that is substantially orthogonal to the central axis of rotation R of the blade 210 and substantially orthogonal to the longitudinal axis LA of handle assembly 110.

The annular rotary knife blade 210 is an annular structure defining the annular body 211 that is generally cylindrical and tapered from the proximal drive section 220 to the distal blade section 260. The rotary knife blade 210 extends from the proximal end 214 to the axially spaced apart distal end 216 and includes the inner wall 212 and the radially spaced apart outer wall 213. The inner wall 212 of the rotary knife blade 210 defines an interior region 228 and a throughbore 229 extending through the blade 1210 and longitudinally centered about the axis of rotation R. Except for the blade cutting edge 218 adjacent the distal end 216 of the annular body 211 where the outer wall 213 tapers toward the inner wall 212; the inner and outer walls 212, 213 are generally parallel. As previously described, the drive section 220 includes, adjacent the proximal end 214, the driven gear 221 which, in one exemplary embodiment is an involute spur gear comprising the plurality of involute gear teeth 222. The outer wall 213 of the drive section 220 further includes the radially inwardly extending bearing groove 230 which is axially spaced from the driven gear 221 along the blade axis of rotation R. The bearing groove 230 defines axially spaced apart lower and upper frustoconical surfaces 232a, 232b.

The frustoconical surfaces 232a, 232b define the bearing faces 230a, 230b of the bearing groove 230 of the rotary knife blade 210 which contact and bear against the upper and lower axially spaced apart bearing surfaces 322a, 322b of the bearing surface 322 of the blade housing bead 320 when the rotary knife blade 210 is supported in the blade housing 300. The blade bearing structure 299 of the power operated rotary knife 100 comprises the above-described bearing interface to rotatably support the blade 210 for rotation.

In one exemplary embodiment, an inner diameter IDDS of the drive section 220 is approximately 1.81 in., while a maximum outer diameter ODDS of the drive section 220, that is the outer diameter in the region of the driven gear 221, is approximately 2.16 in. In one exemplary embodiment, an outer diameter ODBS of the drive section 220 adjacent the bearing groove 230 is approximately 2.00 in., while an outer diameter ODBG of the drive section 220 within the bearing groove 230 is approximately 1.93 in. The outer diameter ODBG also defines a minimum outer diameter of the drive section 220. In one exemplary embodiment, an axial length LDS of the drive section 220 is approximately 0.39 in. and extends from the proximal end 214 of the rotary knife blade 210 to the transition section 235. In one exemplary embodiment, an axial length LDER of the distally extending region 219, which includes the spacer section 240 and the blade section 260, is approximately 4.55 in., while an outer diameter ODDER of the distally extending region 219 is approximately 1.52 in. The outer diameter ODDER of the distally extending region 219 also defines the maximum outer diameter of the spacer section 240 and the maximum outer diameter of the blade section 260. Thus, in the rotary knife blade 210 of the present disclosure, a maximum outer diameter ODDER of the spacer section 240 is smaller than a minimum outer diameter ODBG of the drive section 220 and a maximum outer diameter ODDER of the blade section 260 is smaller than the minimum outer diameter ODBG of the drive section 220. In one exemplary embodiment, the maximum outer diameter of the spacer section 240 and the maximum outer diameter of the blade section 260 are the same and are equal to the maximum outer diameter ODDER of the distally extending region 219. In one exemplary embodiment, the maximum outer diameter ODDER of the distally extending region 219 is less than or equal to 70% of the minimum outer diameter of the drive section. Advantageously, this reduced diameter configuration of the rotary knife blade 210 maintains the mechanical advantage of having a larger diameter drive gear 221 for purposes of more easily rotating the rotary knife blade 210 with the pneumatic motor 510, while, at the same time, the smaller outer diameter of the distally extending region 219 affords reduced blade drag and facilitates ease of manipulation of the blade 210 when the blade is used for example for trimming or cutting operations in a narrow region of the abdominal cavity of a carcass to be trimmed.

The tapered transition section 235 and the cylindrical spacer section 240 of the rotary knife blade 210 extend between the drive section 220 and the blade section 260. The transition section 235 is adjacent the drive section 220, while the spacer section 240 defines a distal cylindrical region 250 extending between the tapered transition section 235 and the blade section 260. An outer wall of the tapered transition region tapers between a larger outer diameter ODBS at a distal end of the drive section 240 and a smaller outer diameter ODDER at a proximal end of the spacer section 240. In one exemplary embodiment, an inner diameter IDCR of the spacer section 240 is approximately 1.44 in., while an axial length of the spacer section 240 is approximately 4.29 in. In one exemplary embodiment, the rotary knife blade 210 has an overall axial length AL of approximately 5.17 in. and a minimum inner diameter of ODMIN at the cutting edge 218 of approximately 1.04 in. As noted above, in one exemplary embodiment of the rotary knife blade 210, the axial length LDER of the distally extending region 219, comprising the spacer section 240 and the blade section 260, is approximately 4.55 in., while the overall axial length AL of the rotary knife blade 210 is 5.17 in. Accordingly, in one exemplary embodiment, the distally-extending or forwardly-extending, reduced outer diameter distally extending region 219 comprises or accounts for approximately 88% of the overall axial length AL of the rotary knife blade 210. Advantageously, this rotary knife blade configuration, which has the reduced outer diameter, forwardly extending region 219 accounting for approximately 88% of the total axial extent AL of the blade 210, facilitates ease of insertion and manipulation of the blade edge 218 within narrow openings in a product. For example, the reduced outer diameter coupled with the large axial length (compared to the overall blade length) of the distally extending region 219 of the rotary knife 210 facilitates an operator of the power operated rotary knife 100 manipulating the knife such that the distally extending region 219 of the blade 210 may be moved forward and inserted into a narrow portion or region of an abdominal cavity of a carcass for the purposed of trimming an internal pocket of fat tissue deep within the abdominal cavity, while the vacuum attachment assembly 600 advantageously provides for vacuum removal and collection of the trimmed pieces of fat tissue as they are trimmed without the necessity of the operator picking up or otherwise collecting the trimmed pieces of fat tissue.

One of skill in the art will understand and appreciate that the dimensions and configuration of the rotary knife blade 210 may vary depending on the cutting/trimming applications that the rotary knife blade 210 is contemplated for use in connection with. The foregoing dimensions and specific configuration of the rotary knife blade 210 is by way of example, without limitation, and the present disclosure contemplates other dimensions and configurations of the rotary knife blade 210 depending on the specific cutting and trimming applications.

Two Part Rotary Knife Blade 270

In one exemplary embodiment, the annular rotary knife blade 210 of the present disclosure is a two-part annular rotary knife blade 270 including a proximal carrier component or portion 280 and a blade component or portion 290 which are releasably connected via a threaded engagement. The drive section 220 and the spacer section 240 comprise the carrier component 280, while the blade section 260 comprises the blade component 290. The blade component 290 includes a proximal connection region 292 which includes an externally threaded outer wall 294. The threaded outer wall 294 threads into a mating threaded inner wall 282 of the carrier portion 280, specifically a threaded distal portion 252 of the cylindrical region 250 of the spacer section 240. In one exemplary embodiment, the threaded outer wall 294 of the proximal connection region 292 of the blade component 290 includes right-hand threads for a threaded engagement between the blade component 290 and the carrier component 280. The blade component 290 includes a radially extending shoulder 296 that seats against an upper or distal surface 254 of the spacer section 240 bridging the inner and outer walls 212, 213 when the blade component 290 is fully threaded into the carrier component 280.

A distal tapered region 298 of the blade component 290 extends from the shoulder 296 to the cutting edge 218 of the blade section 260. The outer wall 213 of the blade 210 in the distal tapered region 298 defines a generally frustoconical surface 256 that converges in a direction away from the drive section 220 and toward the axis of rotation R, terminating at the cutting edge 218. The inner wall 212 of the blade 210 in the distal tapered region 298 defines a proximal cylindrical surface 258 and a distal frustoconical surface 259. The distal frustoconical surface 259 converges in a direction away from the drive section 220 and toward the axis of rotation R, also terminating at the cutting edge 218. One of skill in the art will recognize that the configuration of the blade component 290 may be changed depending on the specific cutting trimming application, for example, the blade component 290 defines a "hook blade" configuration. Depending on the cutting/trimming applications that the rotary knife blade 210 is contemplated for use in connection with, the blade component 290 may be configured as a "flat blade" configuration or a "straight blade" configuration. U.S. Pat. No. 8,745,881 to Thompson et al., issued Jun. 10, 2014 and assigned to the assignee of the present invention, discloses various annular rotary knife blade configurations and two-part annular rotary blades and is incorporated herein in its entirety by reference.

Again, one of skill in the art will understand that the dimensions and configuration of an exemplary embodiment of the rotary knife blade 210, as stated above and as shown in the Figures, may vary depending on the cutting/trimming applications that the rotary knife 100 will be used for. Additionally, the rotary knife blade 210 may be fabricated as a one-piece or one-part blade.

Advantageously, the central axis of rotation R of the rotary knife blade 210 is radially offset by a radial offset distance RO from and substantially parallel to the longitudinal axis LA of handle assembly 110. The radially offset and parallel configuration between the rotary knife blade 210 and the handle assembly 110 allows the adapter 610 of the vacuum attachment assembly 600 to be directly connected to the lower end 306 of the blade housing 300 and further allows a general extent or longitudinal axis VHA of a vacuum hose 680 of the vacuum attachment assembly 610 in a region of a hose bracket 650 to be substantially parallel to the handle assembly longitudinal axis LA and the axis of rotation R of the rotary knife blade 210 for efficient extraction of cut or trimmed material (removed material) by the vacuum attachment assembly 600. Additionally, the adapter 610 of the vacuum attachment assembly 610 is angled away from the handle assembly 110 to provide clearance for the operator's fingers as he or she grips the handle grip 124 and manipulates the power operated rotary knife 100. The adapter 610 defines an adapter central axis ACA which substantially intersects both the handle assembly longitudinal axis LA and the rotary knife blade axis of rotation R. In one exemplary embodiment, the offset angle OA1 between the adapter central axis ACA and the handle assembly longitudinal axis LA is approximately 45° and, similarly, the offset angle OA2 between the adapter central axis ACA and the blade axis of rotation R is 45°.

Blade Housing 300

As can best be seen in FIG. 8, the blade housing 300 is a generally cylindrical blade housing having an inner wall 302 defining the interior region 301 and a radially spaced apart outer wall 304 and the proximal end 306 and an axially spaced apart distal end 308. The throughbore 370 extends through the blade housing 300 from the proximal end 306 to the distal end 308. The blade housing 300 includes a longitudinally extending split 310 though the inner and outer walls 302, 304 to allow expansion of an inner diameter of the blade housing for removal of a rotary knife blade 210 at the end of its useful life and insertion of a new rotary knife blade in its place. Typically, the expected useful lives of the other components of the power operated rotary knife 100, including the blade housing 300 and the vacuum adapter 610, are much greater than the useful life of the rotary knife blade 210, thus, it is expected that the rotary knife blade 210 will be replaced many times during the lifetime of the power operated rotary knife 100. The longitudinally extending split 310 of the blade housing 300 is defined between adjacent side walls 312, 314. The split 310 is generally centered in the mounting region 315 of the blade housing 300.

Near the distal end 308 of the blade housing 300, the inner wall defines a radially inwardly protruding bearing bead 320. The bead 320 defines a bearing surface 322 on which the rotary knife blade 210 is supported for rotation about a rotational plane RP (FIG. 6). Because the rotary knife blade 210 includes the radially inwardly extending generally V-shaped bearing groove or bearing race 230 in its outer wall 213, the bearing surface 322 of the bead 320 comprises upper and lower axially spaced apart bearing surfaces 322a, 322b which contact and bear against mating bearing faces 230a, 230b of the bearing groove 230 of the rotary knife blade 210.

The bearing bead 320 may be continuous around the entire 360° of the inner wall 302 of the blade housing 300 or may be interrupted at one or more points along its circumference to allow for easier expansion of the blade housing 300 when changing rotary knife blades 210. The bearing interaction of the annular bearing groove 230 of the rotary knife blade 210 and the bearing bead 320 of the blade housing 300 results in two axially spaced apart arcuate lines of bearing contact 231a, 231b between the rotary knife blade 210 and the blade housing 300.

The mounting region 315 of the blade housing 300 includes a first, upper circumferentially extending generally rectangular slot 330 that is centered about the longitudinal split 310. The upper or distal slot 330 extending through the blade housing walls 302, 304 provides clearance for the set of gear teeth 554 of the pinion gear 552 to extend into the interior region 301 of the blade housing 300 and engage the set of gear teeth 222 of the rotary knife blade 210 so that the pinion gear 552 can rotate the rotary knife blade 210 about its central axis R. A second, lower circumferentially extending generally oval-shaped slot 340 also centered about the longitudinal split 310 extends through the blade housing walls 302, 304. The lower or proximal slot 340 provides clearance so that the radially or horizontally extending tongue 632 of the upwardly extending housing clamp 630 of the vacuum adapter 610 can extend from the interior region 301 of the blade housing 300 though the inner and outer walls 302, 304 and interfit into the mating slotted recess 432 formed in the arcuate mounting region 430 of the enlarged head 420 of the frame 400. A pair of threaded fasteners 440 extending horizontally through the enlarged head 420 of the frame 400 on opposite sides of the frame throughbore 402, extending through the lower blade housing slot 340, and thread into respective threaded openings 634 of the adapter housing clamp tongue 632. This threaded fastener connection between the frame 400 and the adapter 610 sandwiches the mounting region 315 of the blade housing 300 between the frame 400 and the adapter 610 and secures the blade housing 300 and the vacuum adapter 610 to the frame 400. The pair of threaded fasteners 440 is captured in their respective openings in the enlarged head 420 of the frame 400. That is, the fasteners 420 are configured with enlarged threaded portions such that the fasteners 420 do not fall out of their respective openings in the enlarged head 420 when the fasteners are unscrewed or unthreaded from the respective threaded openings 634 of the adapter housing clamp tongue 632.

The blade housing outer wall 304 includes a single radially outwardly protruding land 350 on one horizontal side 342 of the lower slot 340 and a plurality of circumferentially spaced apart prying lands 352 on an opposite horizontal side 344 of the lower slot 340. When the frame 400 and vacuum adapter 610 are secured by the threaded fasteners 440, as described above, the single land 350 fits into a horizontally extending recess 434a formed on one side 432a of the slotted recess 432 of the frame enlarged head mounting region 430 and the plurality of lands 352 fit into a horizontally extending recess 434b formed on the opposite side of the slotted recess 432. To replace the rotary knife blade 210, both of the threaded fasteners 440 are loosened such that are unthreaded from the respective threaded openings 634 of the adapter housing clamp tongue 632. The blade housing 300 and rotary knife blade 210 are then removed from the arcuate mounting region 430 of the frame 400. A plier-like spreading tool (not shown) is used to increase the circumference of the blade housing 300 such that the worn rotary knife blade 210 may be removed. The spreading tool is also used to spread the blade housing 300 such at a new rotary knife blade 210 may be inserted into the blade housing 300 such that the bearing bead 320 of the blade housing 300 fits into the annular bearing groove 230 of the rotary knife blade 210 to support the blade 210 for rotation with respect to the blade housing 300 about the central axis of rotation R. The blade housing 300, with the new rotary knife blade 210 installed, is then positioned such that the blade housing mounting region 315 is seated against the mounting region 430 of the frame 400 and the vacuum adapter 610 is positioned such that the housing clamp tongue 632 extends through the lower blade housing slot 340 and into the a mating slotted recess 432 formed in the arcuate mounting region 420 of an enlarged head 420 of the frame 400. The two fasteners 440 are then inserted into the threaded openings 634 of the tongue 632 of the vacuum adapter housing clamp 630 and screwed in or tightened to secure the vacuum adapter 610 and the blade housing 300 to the frame 400. The blade housing 300 is sufficient stiff and resilient that the housing 300 will return to is closed or unexpanded diameter condition as soon as the prying force of the spreading tool is released.

The inner wall 302 of the blade housing 300 at its proximal end 306 includes a radially inwardly extending circumferential lip 360 that extends about the entire 360° of the blade housing periphery. As best can be seen in FIG. 6, the lip 360 extends into, but does not contact, a mating arcuate groove 618 formed in an outer wall 616 of a distal annular boss 614 of the adapter 610 in a region of the upwardly extending housing clamp 630 of the adapter 610. The blade housing 300 is secured to the frame 400 and constrained from axial movement with respect to the frame 400 by the threaded interconnection or engagement of the pair of fasteners 440 of the frame 400 and the threaded openings 634 of the tongue 632 of the vacuum adapter housing clamp 630, as explained above. The presence of the lip 360 of the blade housing 300 in the arcuate groove 618 in the outer wall 616 of the vacuum adapter 610 functions to reduce vacuum pressure lost through the blade housing slot 310. The goal is to have as much of the vacuum as possible drawn by the vacuum attachment assembly 600 to be communicated into the interior region 228 of the rotary knife blade 210 and through the throughbore 229 of the rotary knife blade 210 to the cutting edge 218 such that removed product is readily drawn by a strong vacuum through the open regions 228, 301 of the rotary knife blade 201 and blade housing 300 and into the vacuum attachment assembly 600.

When the blade housing 300 is in an expanded diameter condition (when, for example, the rotary knife blade 210 is being changed), as described, above, the circumferential gap between the side walls 312, 314 is increased to allow changing of the blade 210. At the same time, an effective diameter of the lip 360 is increased due to the gap between the side walls 312, 314. When the circumferential gap between the side walls 312 is sufficiently large, an effective diameter of the lip 360 will be large enough such that the annular boss 614 of the adapter 610 may be pull axially down and out of the blade housing 300. Thus, in the expanded diameter condition of the blade housing 300, the vacuum attachment assembly 600 may be detached from the blade housing 300.

Frame 400

Figure 9:
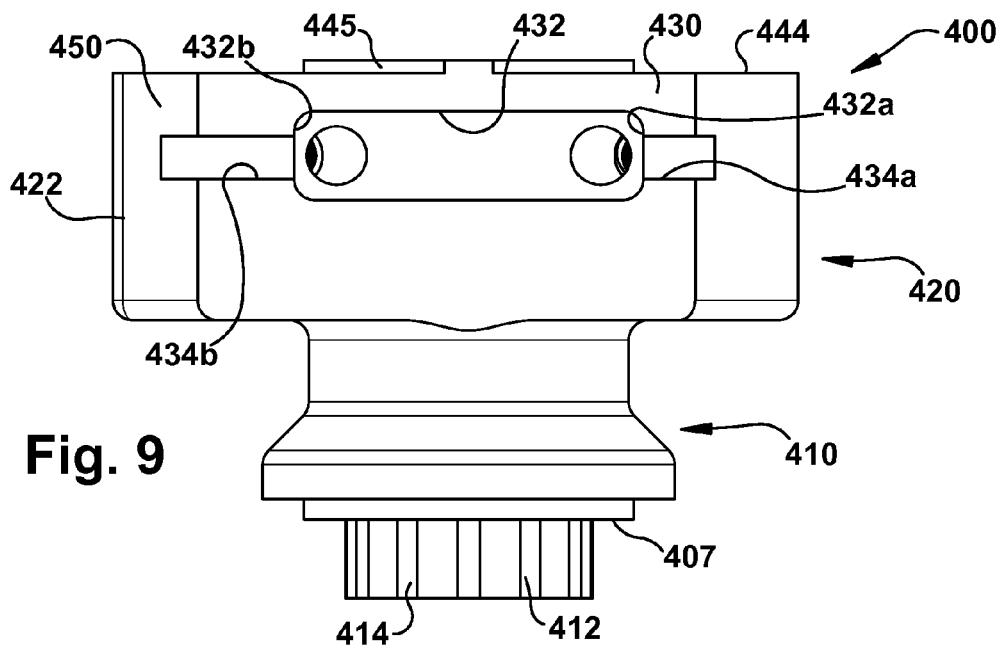
FIG. 9 is a schematic side elevation view of a frame body of a head assembly of the power operated rotary knife of FIG. 1.
Figure 10:
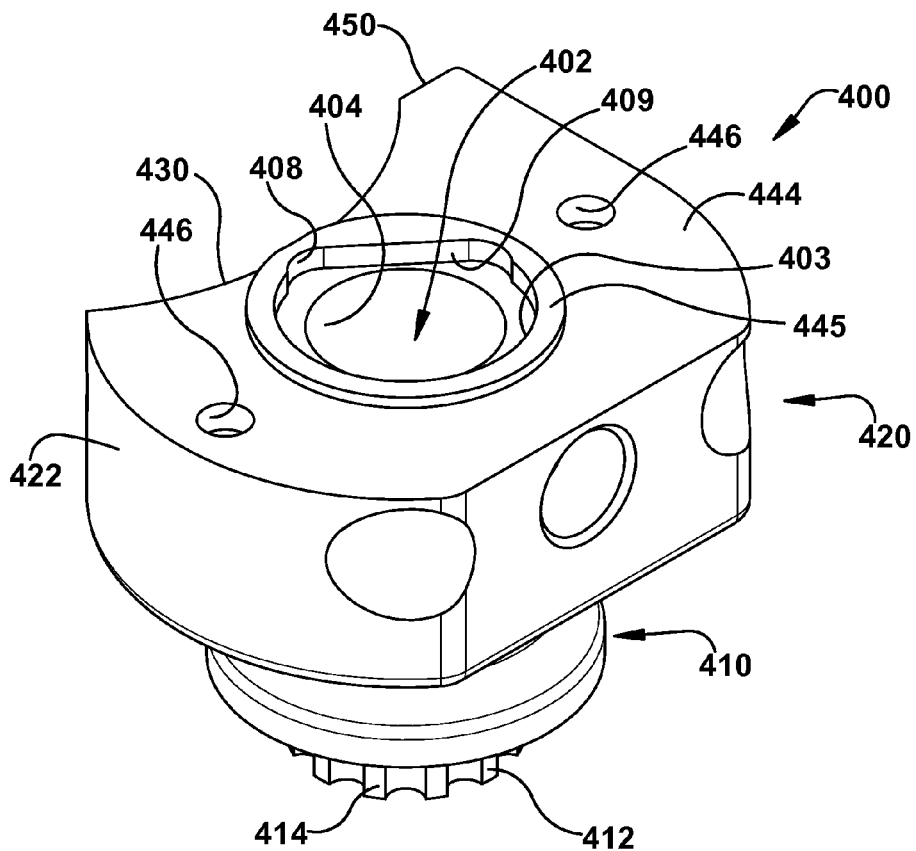
FIG. 10 is a schematic front perspective view of the frame body of FIG. 9.
Figure 13:
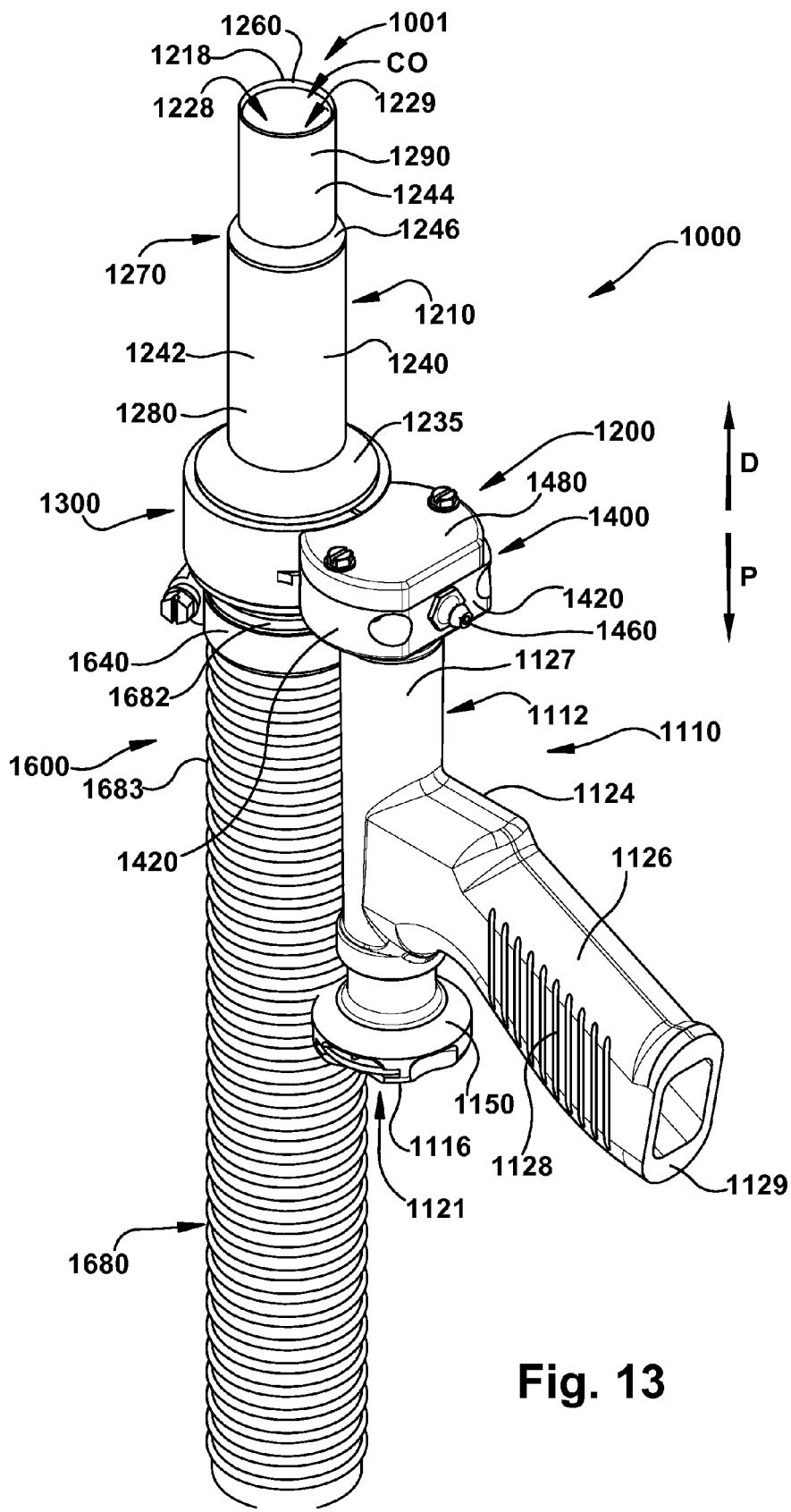
FIG. 13 schematic front perspective view of a second exemplary embodiment of a power operated rotary knife of the present disclosure including a handle assembly, a head assembly, and a vacuum attachment assembly.
Figure 14:
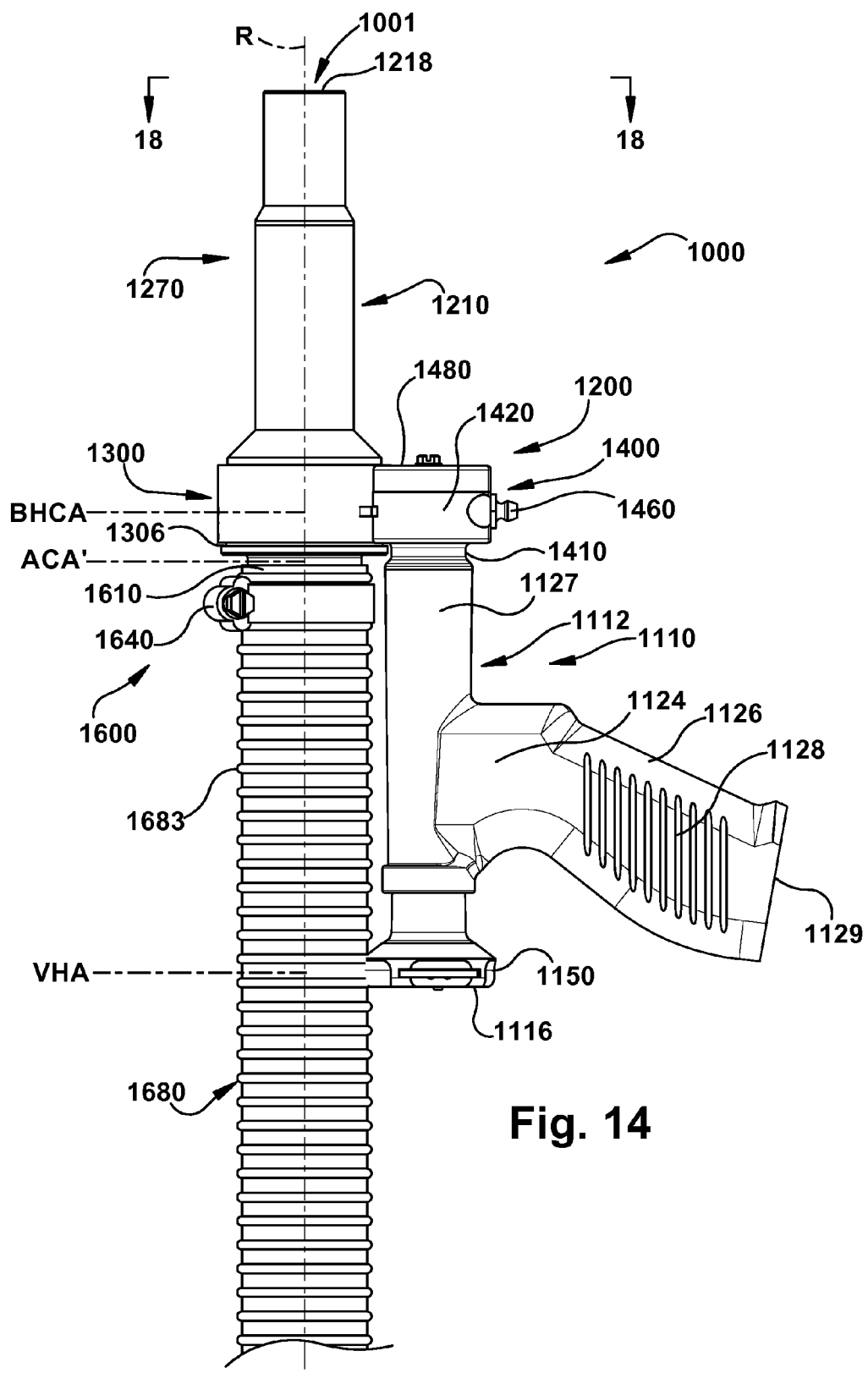
FIG. 14 is a schematic front elevation view of the power operated rotary knife of FIG. 13.

As can best be seen in FIGS. 6, 9 and 10, the frame or frame body 400 includes the proximal cylindrical base 410 and the enlarged head 420. The enlarged head 420 includes the arcuate mounting region 430. The throughbore 402 of the frame 400 is aligned with the handle assembly throughbore 114 and, therefore, is aligned with the handle axis longitudinal axis LA. The inner wall 404 of the frame 400 defining the throughbore 402 includes the interior shoulder 406 that provides a stop for the exterior shoulder 156 of the handle assembly fastener 150 when the fastener 150 is fully tightened into the collar 140 to affix the to the frame 400 to the handle assembly 110. The enlarged head 420 of the frame 400 also includes a generally planar upper surface 444 that provides a seating surface for a pinion gear cover 480. A raised central portion 445 of the upper surface 444 surrounding the throughbore 402 defines a keyed recessed region 408 that receives and supports an enlarged head 562 of the pinion gear bushing 560. To inhibit relative rotation between the pinion gear bushing 560 and the enlarged head 420 of the frame 400, a planar side wall section 564 of the pinion gear bushing enlarged head 420 fits against a planar wall 409 of the keyed recessed region 408. A rearwardly extending cylindrical body 566 of the pinion gear bushing 560 extends into a portion of the throughbore 402 proximal to the recessed region 408.

In addition to supporting the pair of threaded fasteners 440 that extend horizontally through the enlarged head 420 and exit through the slotted recess 432 of the arcuate mounting region 430, the enlarged head 420 also defines a lubricant passageway to route lubricant from a fitting 460 to a bearing interface between the pinion gear 552 and the pinion gear bushing 560. The mounting region 430 is defined by an arcuate portion of a side wall 422 of the enlarged head 420. The arcuate mounting region 430 conforms to the outer diameter of the blade housing 300, when the blade housing 300 is in an unexpanded condition.

The enlarged head 420 of the frame 400 also includes the generally planar upper surface 444 that provides a seating surface for a pinion gear cover 480. The pinion gear head 551 supported by the pinion gear bushing 560 extends axially above the planar upper surface 444 of the enlarged head 420. The upper planar surface 444 of the enlarged head 420 includes a pair of axially extending threaded openings 446. The pinion gear cover 480 attaches to the enlarged head 420 to overlie and protect the pinion gear head 551. The pinion gear cover 480 includes a pair of threaded openings 484 aligned with the threaded openings 446. A pair of threaded fasteners 486 extends through the openings 484 of the pinion gear cover 480 and thread into the threaded openings 446 to secure the pinion gear cover 480 to the enlarged head 420 of the frame 400.

The pinion gear cover 480 includes a bottom wall 481 defining a central recessed region 482. The central recessed region 482 provides clearance for the pinion gear head 551. A side wall 490 of pinion gear cover 480 defines arcuate cutout 492 that intersects the central recessed region 482. The cutout 492 conforms to the arcuate shape of the arcuate mounting region 430 of the enlarged head 420 such that the set of involute gear teeth 554 of the pinion gear 552 may extending radially outwardly beyond the pinion gear cover side wall 490 (and the side wall 422 of the enlarged head 420 in the area of the arcuate mounting region 430) to permit the gear teeth 554 to operatively engage and drive the driven gear 221 of the rotary knife blade 210.

Vacuum Attachment Assembly 600

As can best be seen in FIGS. 1, 3, 11 and 12, the vacuum attachment assembly 600 includes the vacuum adapter 610, the hose bracket 650 and the vacuum hose 680. The vacuum adapter 610 includes a proximal body 612 and the larger diameter upper annular boss 614. A throughbore 611 extends between a first proximal end 620 and a second distal end 622 of the adapter 610 and defines an interior region 639 of the adapter 610. The throughbore 611 defines the central axis ACA of the adapter 610, as described above. The proximal body 612 has the general shape of a truncated cylinder. At the truncated or angled upper end of the body 612 is the radially outwardly and axially upwardly extending annular boss 614. The outer wall 616 of the annular boss 614 includes the arcuate groove 618 that receives the radially inwardly extending lip 360 of the inner wall 302 of the blade housing 300 in the region of the blade housing split 310.

As described above, the annular boss 614 includes the upwardly or axially extending blade housing clamp 630 which, in turn, includes horizontally extending tongue 632. The radially extending tongue 632 extends thought the lower slot 340 of the blade housing 300 and into the slotted recess 432 of the enlarged head 420 of the frame 400. The pair of fasteners 440 on either side of the frame throughbore 402 threaded into the threaded openings 634 in the tongue 632 to clamp together the vacuum adapter 610, the blade housing 300 and the frame 400. Stated another way, when the pair of fasteners 440 of the frame 400 threadedly engage the respective threaded openings 634 of the housing clamp 630 of the vacuum adapter 610, the vacuum adapter 610 bears against the blade housing 300 in a region of the blade housing split 310 to releasably affix the blade housing 300 to the frame 400 and to releasably affix the vacuum attachment assembly 600 to the frame 400. The blade housing 300 is sandwiched between the vacuum adapter 610 and frame 400 as the pair of fasteners 440 are tightened into the threaded openings 634 of the tongue 632 of the housing clamp 630.

The proximal body 612 of the adapter 610 defines a sleeve that receives an end portion 682 of the flexible vacuum hose 680. An exterior hose clamp 640 secures the end portion 682 of the vacuum hose 680 to the adapter proximal body 612. In one exemplary embodiment, an inner diameter of the vacuum hose 680 is approximately 1.5 in. The vacuum hose 680 defines a central opening or throughbore 681 which, in turn defines an interior region 686 of the vacuum hose 680.

As noted previously, the central axis ACA of the vacuum adapter 610 is angled away from the handle assembly longitudinal axis LA and the blade axis of rotation R to provide clearance between the vacuum hose 680 and the operator's hand, while at the same time addressing the need to keep the front profile of the power operated rotary knife 100 as small as possible given the need for the knife 100 to be inserted into and manipulated in narrow body cavities, such as abdominal cavities of carcasses, and the like. The front profile of the rotary knife 100, the boundaries of which are shown schematically by dimensions FP1, FP2 in FIG. 4, may be viewed as an approximate total frontage area or area effectively occupied by the power operated rotary knife 100 when looking in a proximal direction P (FIG. 3) toward a distal end 101 of the knife 100 along a line of the axis of rotation R.

The hose bracket 650 functions to fix the position of the vacuum hose 680 a fixed distance away from the handle assembly 100 such that the hose 680 does not interfere with the operator's hand as the operator manipulates the handle grip 124, while, at the same time, maintains a portion 683 of the vacuum hose 680 that is proximal to the end portion 682 coupled to the adapter 610 in a generally parallel direction with respect to the handle assembly longitudinal axis LA and the rotary knife blade axis of rotation R. In this way, the vacuum hose 680 does not hinder manipulation of the power operated rotary knife 100 by the operator and, at the same time, provides as small a possible front profile FP for the knife 100.

The hose bracket includes a cylindrical sleeve 652 and a collar 654 which are connected by a brace 656. The brace 656 functions to space apart and offset the cylindrical sleeve from the collar 654 radially and axially. The vacuum hose 680 extends through the sleeve 652 and the collar 654 fits over the outer wall 122 of the handle housing 112 in a region of thee coupling collar 130. The collar 130 abuts a stepped shoulder 160 in the outer wall 122 between collar 130 and the handle grip 124.

The throughbore 681 and interior region 686 of the vacuum hose 680 are in fluid communication with the throughbore 611 and the interior region 639 of the vacuum adapter 610 which are in fluid communication with the throughbore 370 and the interior region 301 of the blade housing 300 which are in fluid communication with the throughbore 229 and interior region 228 of the rotary knife blade 210. Accordingly, when the vacuum attachment assembly 600 is assembled to the blade housing 300 and the rotary knife blade 210 is assembled to the blade housing 300 and a vacuum pump (not shown) is actuated to draw a vacuum pressure in the vacuum hose 680, because of the fluid communication between the vacuum attachment assembly 600, the blade housing 300 and the rotary knife blade 210 of the head assembly 200, vacuum pressure will be present in the interior region 228 and the throughbore 229 of the rotary knife blade 210. Thus, cut or trimmed product (removed material), cut by the cutting edge 218 of the blade 210 will be pulled or routed by the vacuum pressure in a proximal or rearward direction though the aligned throughbores 229, 370, 611, 681 and, ultimately, routed through the vacuum hose 680 where the removed material is collected in a canister (not shown) for further processing, inspection, grading, packaging, or disposal, depending on the nature of the removed material.

In one exemplary embodiment of the power operated rotary knife 100, the handle housing 112 may be fabricated of stainless steel, while the handle grip 124 may be fabricated of plastic or other material or materials known to have comparable properties and may be formed by molding and/or machining, for example, the handle grip may be fabricated of two over molded plastic layers, an inner layer comprising a hard plastic material and an outer layer or gripping surface comprised of a softer, resilient plastic material that is more pliable and easier to grip for the operator. The frame 400 of the head assembly 200 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. The vacuum adapter 610 of the vacuum attachment assembly 600 may be fabricated of aluminum or steel.

Second Exemplary Embodiment—Power Operated Rotary Knife 1000

Turning to the drawings, a second exemplary embodiment of a power operated rotary knife of the present invention is generally shown at 1000 in FIGS. 13-18. The power operated rotary knife 1000 of the second exemplary embodiment is similar in structure and function to the power operated rotary knife 100 of the first exemplary embodiment. For brevity, the structural details/functions/advantages of those components and assemblies of the power operated rotary knife 1000 which are similar to the corresponding components and assemblies of the power operated rotary knife 100 will not be repeated in detail, all of the structural details/functions/advantages discussed above with respect to the power operated rotary knife 100 are hereby incorporated by reference. Common reference numbers and letters used in the two embodiments are assumed to represent similar concepts and/or structural details.

Like the power operated rotary knife 100 of the first exemplary embodiment, the power operated rotary knife 1000 of the second exemplary embodiment includes an elongated handle assembly 1110, a head assembly 1200 releasably coupled to and extending from a distal end 1118 of the handle assembly 1110 and a vacuum attachment assembly 1600 releasably coupled to a proximal end 1306 of a blade housing 1300 of the head assembly 1200. The power operated rotary knife 1000 additionally includes a drive mechanism 1500 that is coupled to an annular rotary knife blade 1210 of the head assembly 1200 and provides motive power to rotate the rotary knife blade 1210 with respect to the blade housing 1300 about a blade central axis of rotation R. In one exemplary embodiment, the drive mechanism 1500 may comprise a remote motor drive and a flexible shaft drive transmission which transfers rotational power from the motor drive to rotate a drive train 1550 of the power operated rotary knife 1000. The flexible shaft drive transmission includes a driver assembly which is received in a central, longitudinally extending throughbore 1114 of the handle assembly 1110 to rotatably drive the drive train 1550 (such as a pinion gear) of the drive mechanism 1500. Such a drive mechanism, including a remote motor drive and flexible shaft drive transmission and driver assembly, are disclosed in U.S. Pat. No. 8,968,107 to Rapp et al., issued Mar. 3, 2015 and U.S. Published Application No. US2013/0174424 to Whited et al., published Jul. 11, 2013, both of which are assigned to the assignee of the present invention. Both U.S. Pat. No. 8,968,107 and U.S. Published Application No. US2013/0174424 are incorporated herein in their respective entireties by reference. The drive train 1550 may include a pinion gear 1552 rotatably supported in a pinion gear bushing 1560, as described with respect to the drive train 550 of the first exemplary embodiment of the power operated rotary knife 100. In an alternate exemplary embodiment, the drive mechanism 1500 may include a pneumatic motor (not shown, but similar in structure and function to the pneumatic motor 510 of the power operated rotary knife 100) and a drive train 1550 to couple the rotational force of a rotating output shaft of the pneumatic motor to rotate the rotary knife blade 1210.

As is best seen in FIGS. 13-18, the head assembly 1200 includes the annular rotary knife blade 1210 rotatably supported by the blade housing 1300. The head assembly 1200 further includes a frame or frame body 1400 which supports the rotary knife blade 1210 and the blade housing 1300 and, in turn, is releasably coupled to the handle assembly 1110. The frame 1400 includes a proximal cylindrical base 1410 and an enlarged distal head 1420. A throughbore 1402 extends through the frame 1400 and is aligned with the handle assembly throughbore 1114 along the handle assembly longitudinal axis LA. The enlarged head 1420 of the frame 1400 includes an arcuate mounting region 1430 (FIG. 15, similar to mounting region 430 of the frame 400 of the power operated rotary knife 100 of the first exemplary embodiment, as seen in FIGS. 9 and 10). The mounting region 1430 of the frame 1400 provides a seating region for a mounting region 1315 of the blade housing 1300 and further includes a slotted recess 1432 that receives a radially extending tongue 1632 of a housing clamp 1630 of a vacuum adapter 1610 of the vacuum attachment assembly 1600 to releasably secure the adapter 1610 and the blade housing 1300 to the frame 1400. The enlarged head 1420 of the frame 1430 is covered by pinion gear cover 1480 to protect the pinion gear 1552 and is tapped to receive a lubricant fitting 1460, as described above with respect to the first exemplary embodiment of the power operated rotary knife 100.

The blade housing 1300 (FIG. 15) supports the rotary knife blade 1210 for rotation about the blade central axis of rotation R and defines a rotational plane RP of the blade 1210. The blade housing 1300 is generally cylindrical and includes a side wall 1300a defining open proximal and distal ends and an open interior region 1301. The side wall 1300a includes an inner wall 1302 defining an axially extending throughbore 1370. The blade housing 1300 includes a split 1310 to allow for circumferential expansion of the blade housing diameter to facilitate changing of the rotary knife blade 1210. The blade housing 1300 include a mounting region 1315 for securing to the that includes an upper slot 1330 and a lower slot 1340. The upper slot provides for clearance for the pinion gear 1552 to drive the rotary knife blade 1210 and the lower slot 1340 allows passage of the radially extending tongue 1632 of the vacuum adapter 1630 to engage the mounting region 1430 of the frame 1400. The inner wall 1302 of the blade housing 1300 includes a radially inwardly extending lip 1360 that extends into an arcuate groove 1618 (FIG. 21) in an outer wall 1616 of the annular boss 1614 of the vacuum adapter 1610 in the region of the blade housing split 1310

Figure 15:
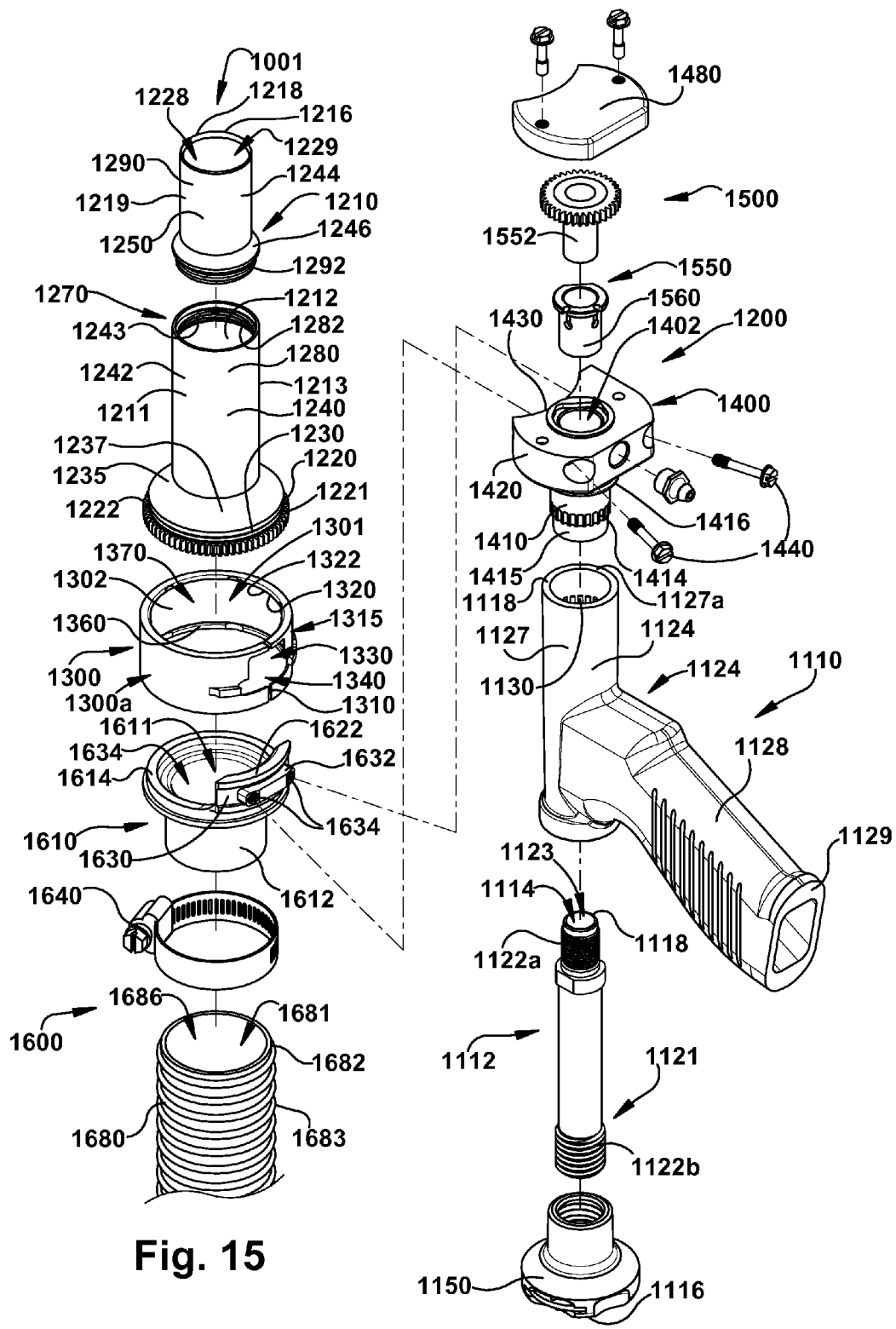
FIG. 15 is a schematic exploded perspective view of the power operated rotary knife of FIG. 13.

As can best be seen in FIG. 15, the handle assembly 1110 includes an elongated, generally cylindrical handle housing 1112 defining the central, longitudinally extending throughbore 1114 of the handle assembly 1110 that extends from a first, proximal or rearward end 1116 of the handle assembly 1110 to the second, distal or forward end 1118 of the handle assembly 1110. A central longitudinal axis LA of the handle assembly 1110 extends through the handle assembly throughbore 1114. The handle housing 1112 includes a hand piece 1124 and a hand piece retaining assembly 1121 which secures the hand piece 1124 in a rotational position (about the handle assembly longitudinal axis LA), as selected by the operator, and couples the hand piece 1124 to the cylindrical base 1410 of the frame 1400. The hand piece retaining assembly 1121 includes an elongated central core 1122 and a coupling collar 1150, which threads onto a threaded proximal end 1122b of the elongated central core 1122. A central throughbore 1123, which is concentric with the handle assembly longitudinal axis LA, defines the handle housing throughbore 1114. A threaded distal end 1122a of the elongated central core 1122 is threadedly received in a threaded distal portion 1420 (FIG. 16) of the throughbore 1402 of the frame 1400 to secure the handle assembly 1110 to the frame 1400. The coupling collar 1150 functions to releasably secure the driver assembly (not shown) of the flexible shaft drive transmission to the handle assembly 1110 so that the a drive coupling of the driver assembly engages and rotates the pinion gear 1552 of the drive train 1550 to rotatably drive the rotary knife blade 1210.

Figure 16:
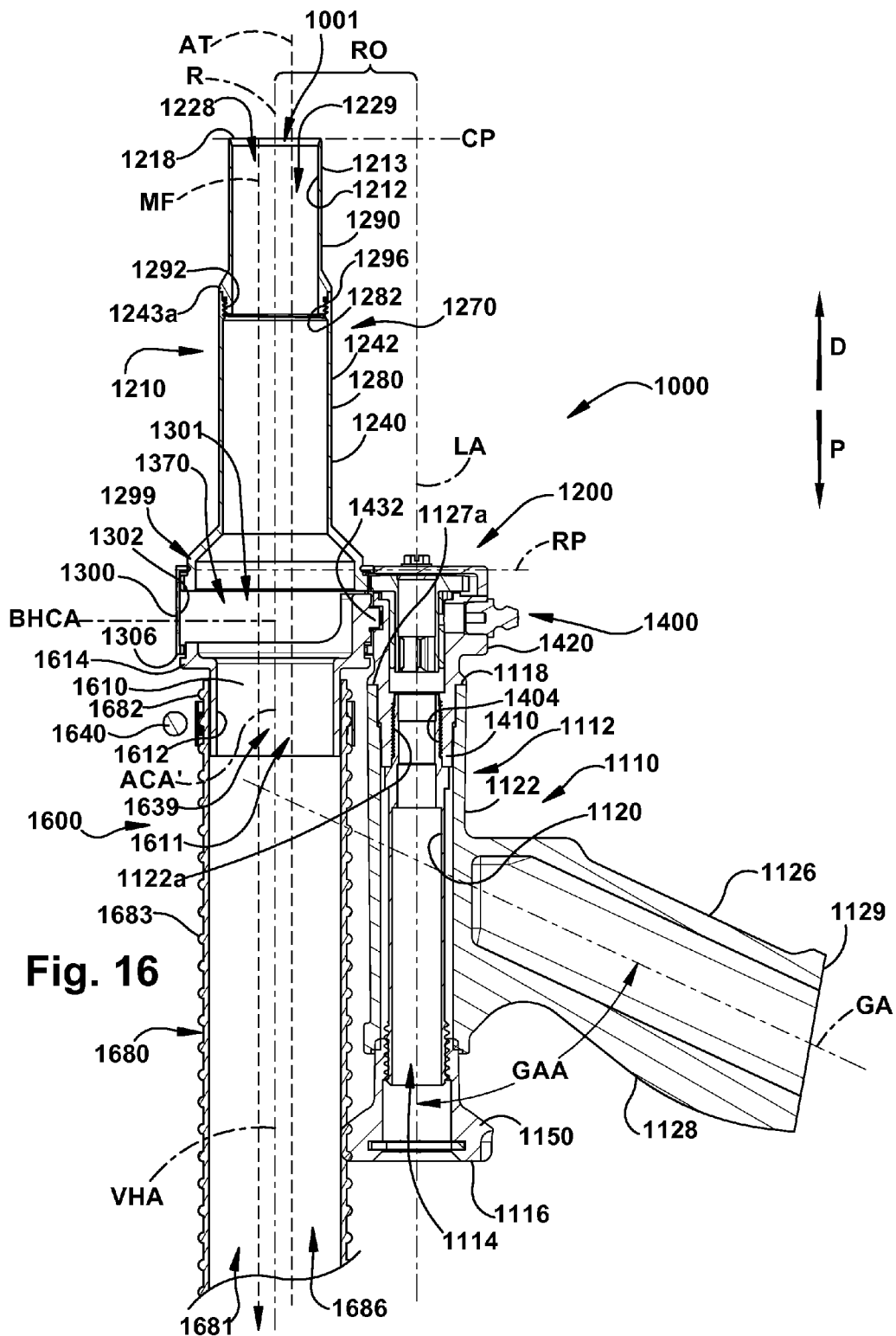
FIG. 16 is a schematic longitudinal, front elevation, section view of the power operated rotary knife of FIG. 13.

The handle assembly 1112 (FIG. 15) includes an inner wall 1120, defined by the handle housing throughbore 1114 and an outer wall 1122, defined by the hand piece 1124. The hand piece 1124 is mounted on the elongated central core 1122 of the hand piece retaining assembly 1121. The hand piece or handle grip 1124 includes a cylindrical hand piece body 1127 and a pistol grip handle 1126 extending transversely from the hand piece body 1127. The pistol grip handle 1126, which defines a gripping surface 1128, extends along a gripping axis GA (FIG. 16) that is transverse to and intersects the handle assembly longitudinal axis LA. In one exemplary embodiment, as can be seen in FIG. 16, a grip angle GAA between the gripping axis GA and the handle assembly longitudinal axis LA when measured as an acute angle between a distal end 1129 of the pistol grip handle 1126 and the proximal end 1116 of the handle assembly 1112 is approximately 65°. A rotational position of the hand piece 1125 about the handle assembly longitudinal axis LA is selected by the user based on a selected interfit between an annular set of splines defined by an outer wall 1415 of the cylindrical base 1410 of the frame 1400 and a corresponding mating set of splines 1130 formed on an inner wall 1125 of the hand piece body 1127. As can be best seen in FIG. 16, the distal end 1118 of the handle assembly is defined by an upper end 1127a of the hand piece body 1127, which abuts a stepped shoulder 1415 formed in the outer wall 1415 of the cylindrical base 1410 of the frame 1400.

The vacuum attachment assembly 1600 of the power operated rotary knife 1000 includes a vacuum hose 1680 and the vacuum adapter 1610 which couples the vacuum hose 1680 to the proximal end 1306 of the blade housing 1300. An interior region 1686 of defined by the vacuum hose 1680 is in fluid communication with respective interior regions 1228, 1301 of the rotary knife blade 1210 and the blade housing 1300. The rotary knife blade interior region 1228 and the blade housing interior region 1301 are defined by aligned throughbores 1229, 1370 of the knife blade 1210 and blade housing 1300. Vacuum pressure drawn in the vacuum hose interior region 1686 is communicated through the rotary knife blade interior region 1228 and the blade housing interior region 1301 such that removed material cut by the rotary knife blade 1210 flows or is routed from a distal cutting edge 1218 of the rotary knife blade 1210 though the interior regions 1228, 1301 of the rotary knife blade and blade housing 1210, 1300, through the vacuum adapter interior region 1639 and into the vacuum hose interior region 1686. The removed material accumulates in a container (not shown) at a proximal end of the vacuum hose 1680.

Figure 20:
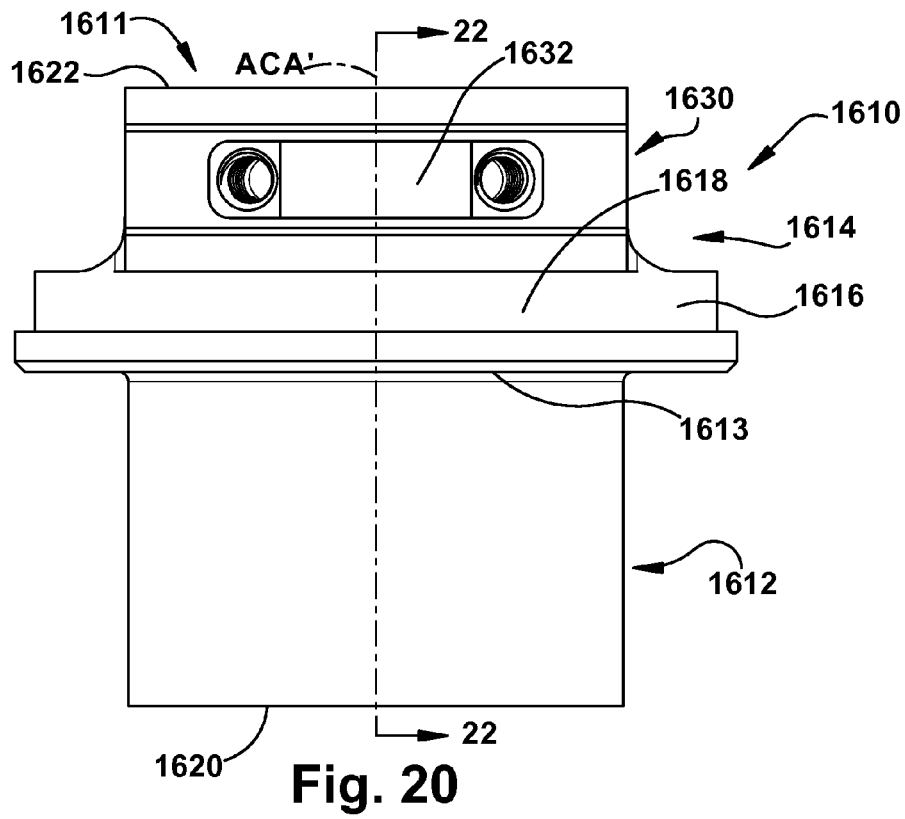
FIG. 20 is a schematic side elevation view of a vacuum adapter of a vacuum attachment assembly of the power operated rotary knife of FIG. 13.
Figure 21:
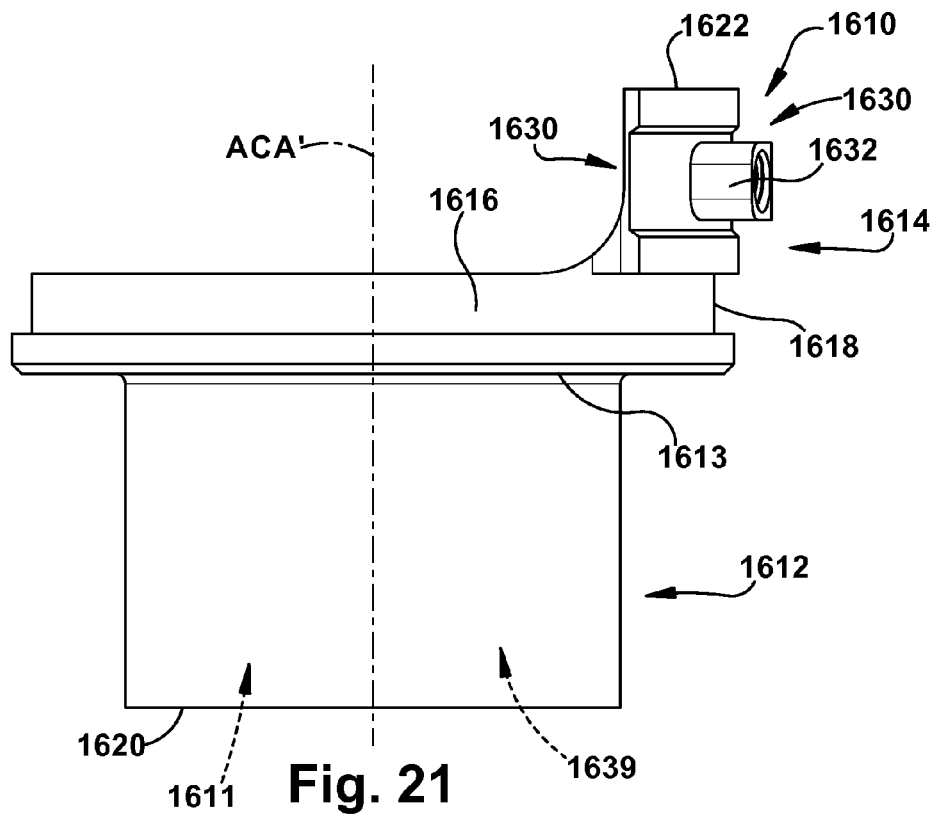
FIG. 21 is a schematic front elevation view of the vacuum adapter of FIG. 20.
Figure 22:
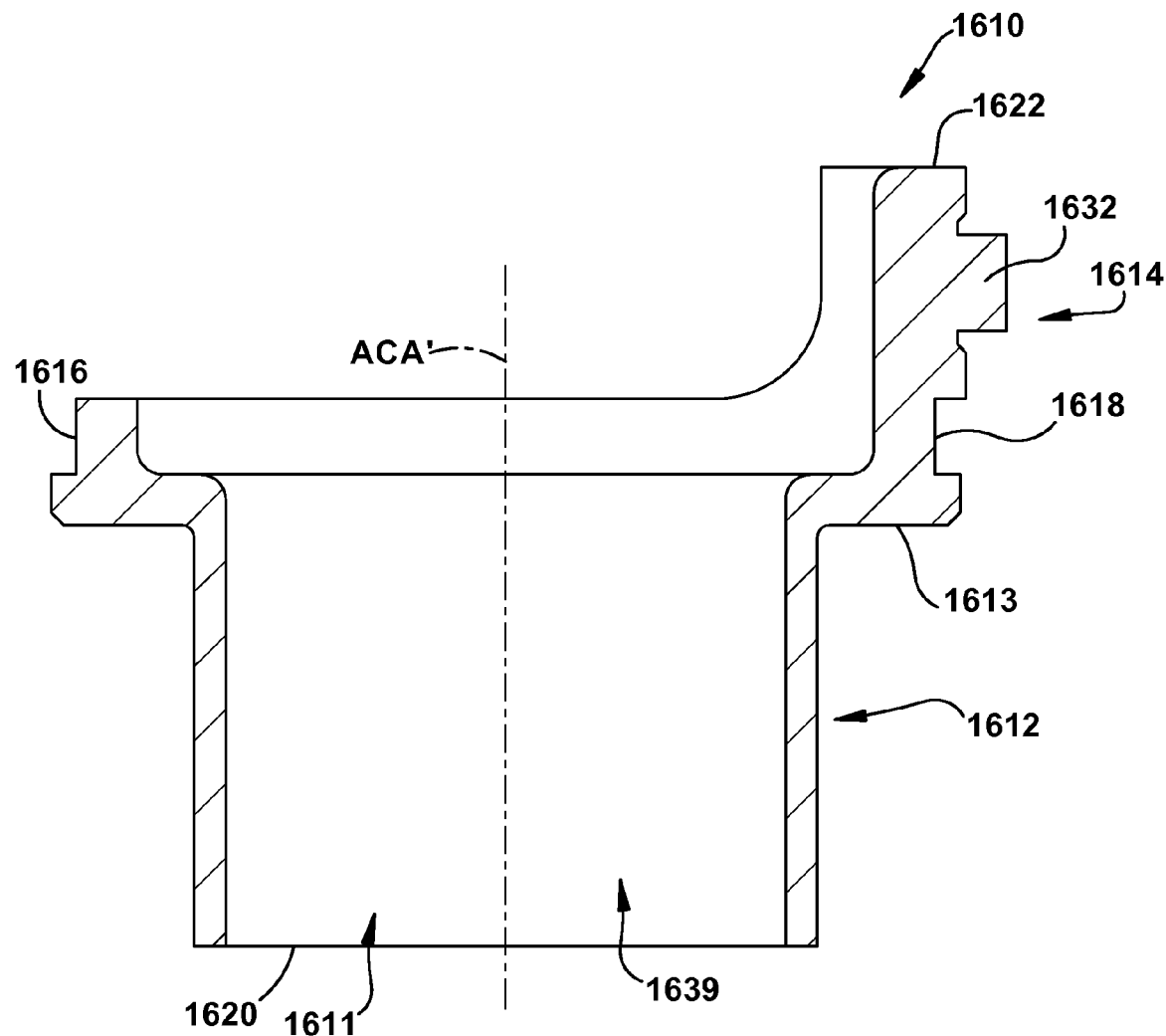
FIG. 22 is a schematic longitudinal, section view of the vacuum adapter of FIG. 20, as seen from a plane indicated by the line 22-22 in FIG. 20.

As is best seen in FIGS. 20-22, the vacuum adapter 1610 includes a proximal body 1612 and the larger diameter upper annular boss 1614. A throughbore 1611 extends between a first proximal end 1620 and a second distal end 1622 of the adapter 1610 and defines an interior region 1639 of the adapter 1610. The throughbore 1611 defines the central axis ACA' of the adapter 1610. Note that unlike the central axis ACA of the vacuum adapter 610 of the first exemplary embodiment of the power operated rotary knife 100, which is transverse to the central axis of rotation R of the rotary knife blade 10 and transverse the longitudinal axis LA of the handle assembly 110, by contrast, the central axis ACA' of the vacuum adapter 1610 of the second exemplary embodiment of the power operated rotary knife 1000 is substantially parallel and coincident with the central axis of rotation R of the rotary knife blade 1610 and is substantially parallel to the longitudinal axis LA of the handle assembly 110. The proximal body 1612 of the adapter 1610 has the general shape of a cylinder. That is, as can best be seen in FIGS. 16 and 18, the central axis ACA' of the vacuum adapter 1610 is substantially coincident or congruent and aligned with the central axis of rotation R of the rotary knife blade 1610 and a central axis BHCA of the blade housing 1300 and the central axis ACA' of the adapter 1610 is substantially parallel to the longitudinal axis LA of the handle assembly 110. The proximal body 1612 of the adapter 1610 defines a sleeve that receives an end portion 1682 of the flexible vacuum hose 1680. An exterior hose clamp 1640 secures the end portion 1682 of the vacuum hose 1680 to the adapter proximal body 1612. The vacuum hose 1680 defines a central opening or throughbore 1681 which, in turn defines the interior region 1686 of the vacuum hose 1680. The throughbore 1681 of the vacuum hose 1680 defines a central axis VHA of the vacuum hose 1680.

As can best be seen in FIGS. 16-19, the annular rotary knife blade 1210 of the head assembly 1200 includes a generally cylindrical annular body 1211. The annular body 1211 of the rotary knife blade 1210 includes an inner wall 1212 and a radially spaced apart outer wall 1213 and extends from a first, proximal end 1214 and a second, distal end 1216, which defines the cutting edge 1218 of the blade. The inner wall 1212 of the rotary knife blade 1210 defines a cutting opening CO (FIGS. 13, 18 and 19) of the power operated rotary knife 1000, that is, the opening defined by the rotary knife blade 1210 that cut/trimmed/severed material passes through, as the power operated rotary knife 1000 is manipulated by an operator to cut or trim a product. The cutting opening CO defined by the rotary knife blade 1210 is in fluid communication with the interior regions interior regions 1228, 1301, 1639, 1686 of the rotary knife blade 1210, the blade housing 1300, the vacuum adapter 1610 and the vacuum hose 1680, respectively. The cutting edge 1218 of the rotary knife blade 1210 also defines a cutting plane CP (FIGS. 16 and 19) of the blade 1210, which is coincident with the cutting opening CO and substantially orthogonal to the blade central axis of rotation R and the handle assembly longitudinal axis LA.

The annular body 1211 of the rotary knife blade 1210 includes an annular drive section 1220, adjacent the proximal end 1214 of the blade 1210, an intermediate, elongated spacer section 1240, and a blade section 1260, adjacent the distal end 1216 of the blade 1210. A tapered transition section 1235 extends between the drive section 1220 and the spacer section 1240. The tapered transition section 1235 defines a necked-down tapered region 1237 that transitions from a larger diameter of the annular drive section 1220 to a smaller diameter of the spacer section 240 and a smaller diameter of the blade section 1260. The spacer section 1240 and the blade section 1210 define a distally extending region 1219 of the rotary knife blade 1210. In one exemplary embodiment, the spacer section 1240 comprise a first diameter proximal spacer region 1242, a second, smaller diameter distal spacer region 1244 and a third transition spacer region 1246 that bridges the respective diameters of the first and second spacer regions 1242, 1244.

Advantageously, the annular blade section 1260 and the annular spacer section 1240 of the power operated rotary knife 1210 have a reduced outer diameter compared with an outer diameter of the drive section 1220. The reduced outer diameter of the blade and spacer sections 1260, 1240 affords reduced drag and ease of manipulation and position of a distally extending region 1219 of the rotary knife blade 1210 which is likely to contact the product during cutting and trimming operations. Further, the larger outer diameter of the drive section 1220, which allows for a diameter of a driven gear 1221 formed on the outer wall 1213 of the annular body 1211 to be larger, as compared to the distally extending region 1219, thereby providing a mechanical advantage with respect to rotatably driving the blade 1210 versus a smaller driven gear diameter.

The power operated rotary knife 1000 of the second exemplary embodiment differs from the power operated rotary knife 100 of the first exemplary embodiment in certain respects including the following. The vacuum adapter 1610 of the vacuum attachment assembly 1600 of the power operated rotary knife 1000 is straight and extends along a direction substantially congruent with the central axis of rotation R of the rotary knife blade 1210 and parallel to the longitudinal axis LA of the handle housing 1112. As noted above, the central axis ACA' of the vacuum adapter 1610 defined by the adapter throughbore 1611 is substantially congruent or coincident with a central axis of rotation R of the rotary knife blade 1210 and is substantially parallel to a longitudinal axis LA of the handle assembly 1110. By comparison, the angled vacuum adapter 610 of the vacuum attachment assembly 600 of the power operated rotary knife 100 angles away from the handle housing 112 such that the adapter central axis ACA is transverse with respect to the central axis of rotation R of the rotary knife blade 210 and the handle assembly longitudinal axis LA and intersects the knife blade central axis of rotation R and handle assembly longitudinal axis LA.

The straight design of the vacuum adapter 1610 allows for a throughbore 1611 defined by the vacuum adapter 1610 to be in axial and concentric alignment with: a) a throughbore 1370 defined by the blade housing 1300; b) a throughbore 1229 defined by the rotary knife blade 1210; and c) a throughbore 1680 defined by the vacuum hose 1680. Stated another way, the rotary knife blade central rotational axis R, a central axis BHCA of the blade housing 1300, the central axis ACA' of the vacuum adapter 1610, and the central axis VHA of a portion 1683 of the vacuum hose 1680 that is proximal to the end portion 1682 of the vacuum hose 1680 are all substantially congruent or in-line and are all substantially parallel to the handle assembly longitudinal axis LA. The straight-line or in-line axial alignment of the throughbores 1229, 1370, 1611, 1681 of the rotary knife blade 1210, the blade housing 1300, the vacuum adapter 1610, and the vacuum hose 1680, respectively, (depicted schematically as AT for axially aligned throughbores in FIGS. 16 and 17) and the coincident or congruent central axes R (blade axis of rotation), BHCA (blade housing central axis), ACA' (adapter central axis), VHA (vacuum hose central axis), advantageously provides for a straight-line or in-line flow of cut or trimmed material from the cutting edge 1218 of the rotary knife blade 1210, through the rotary knife blade interior region 1228, through the blade housing interior region 1301, through the vacuum adapter interior region 1639, and into the vacuum hose interior region 1686. The straight-line flow of cut material through the respective aligned interior regions is depicted schematically as MF in FIGS. 16 and 17. Stated another way, having the throughbores 1370, 1611, 1681 of the blade housing 1300, the vacuum adapter 1610, and the vacuum hose 1680 congruent, in fluid communication and concentrically aligned with the central axis of rotation of the rotary knife blade 1210 provides an generally unobstructed, straight-line flow of cut or trimmed material from the knife blade interior region 1228 through the blade housing interior region 1301, through the vacuum adapter interior region 1639, and into the vacuum hose interior region 1686.

The handle assembly 1110 includes the pistol grip handle 1126 which is used by the operator to manipulate the power operated rotary knife 1000 during cutting and trimming operations. Unlike the generally cylindrical handle grip 124 of the handle assembly 110 of the first embodiment power operated rotary knife 100, a handle grip 1124 of the handle assembly 1110 includes the pistol grip handle 1126 that extends from the generally cylindrical handle body 1127. The pistol grip handle 1126 extends along the gripping axis GA that is transverse to and intersects the central longitudinal axis LA of the handle assembly 1110. The gripping surface 1128 of the pistol grip handle 1126, which is grasped by the operator's hand, is offset radially and spaced apart from handle assembly central longitudinal axis LA, while the cylindrical handle body 1127, like the handle grip 124 of the handle assembly 110, is concentric about the handle assembly longitudinal axis LA.

The pistol grip handle 1126 and the associate gripping surface 1128 are radially offset from the handle assembly longitudinal axis LA and the general extent of the cylindrical handle body 1127 and handle housing 1112. Because the pistol grip handle 1126 is radially offset from the handle assembly longitudinal axis LA in a direction away from the vacuum hose 1680, it is not necessary to provide clearance between the handle grip 124 and the vacuum hose 680 for the operator's fingers, as was the case in the power operated rotary knife 100 of the first embodiment. As such, the proximal cylindrical body 1612 of the vacuum adapter 1610 does not need to be angled away from the handle assembly longitudinal axis LA, as was the case with the cylindrical body 612 of the vacuum adapter 610 of the power operated rotary knife 100. The straight configuration of the vacuum adaptor 1610 advantageously results in the straight-line, in-line, and concentric alignment of the throughbores 1229, 1370, 1611, 1681 of the rotary knife blade 1210, the blade housing 1300, the vacuum adapter 1610, and the vacuum hose 1680 thus providing an unobstructed, straight-line flow of cut or trimmed material from the knife blade interior region 1228 through the blade housing interior region 1301, through the vacuum adapter interior region 1639, and into the vacuum hose interior region 1686.

Rotary Knife Blade 1210 of Head Assembly 1200

Figure 17:
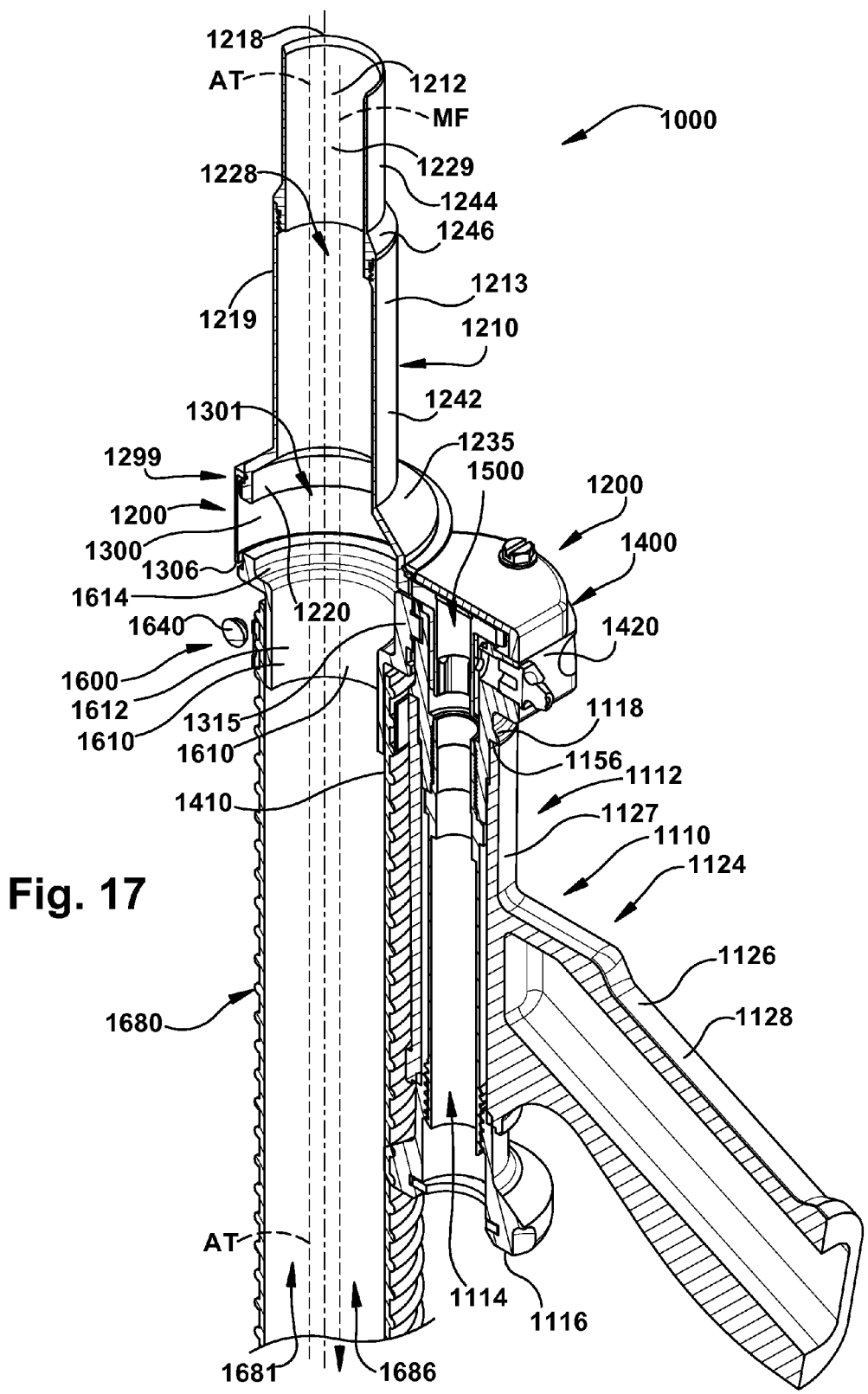
FIG. 17 is a schematic longitudinal, front perspective, section view of the power operated rotary knife of FIG. 13.
Figure 18:
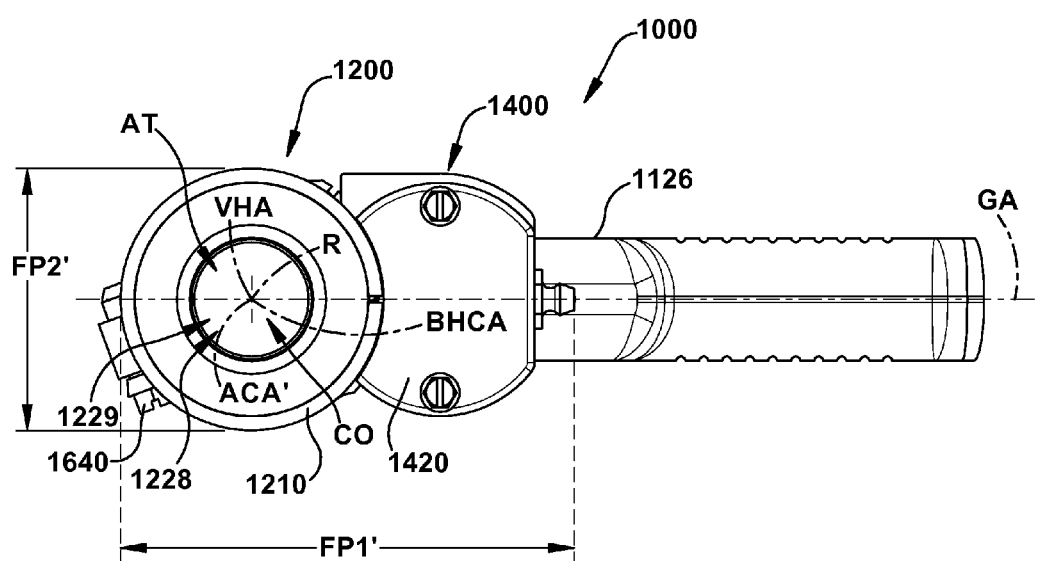
FIG. 18 is a schematic top plan view of the power operated rotary knife of FIG. 13, as seen from a plane indicated by the line 18-18 in FIG. 14.
Figure 19:
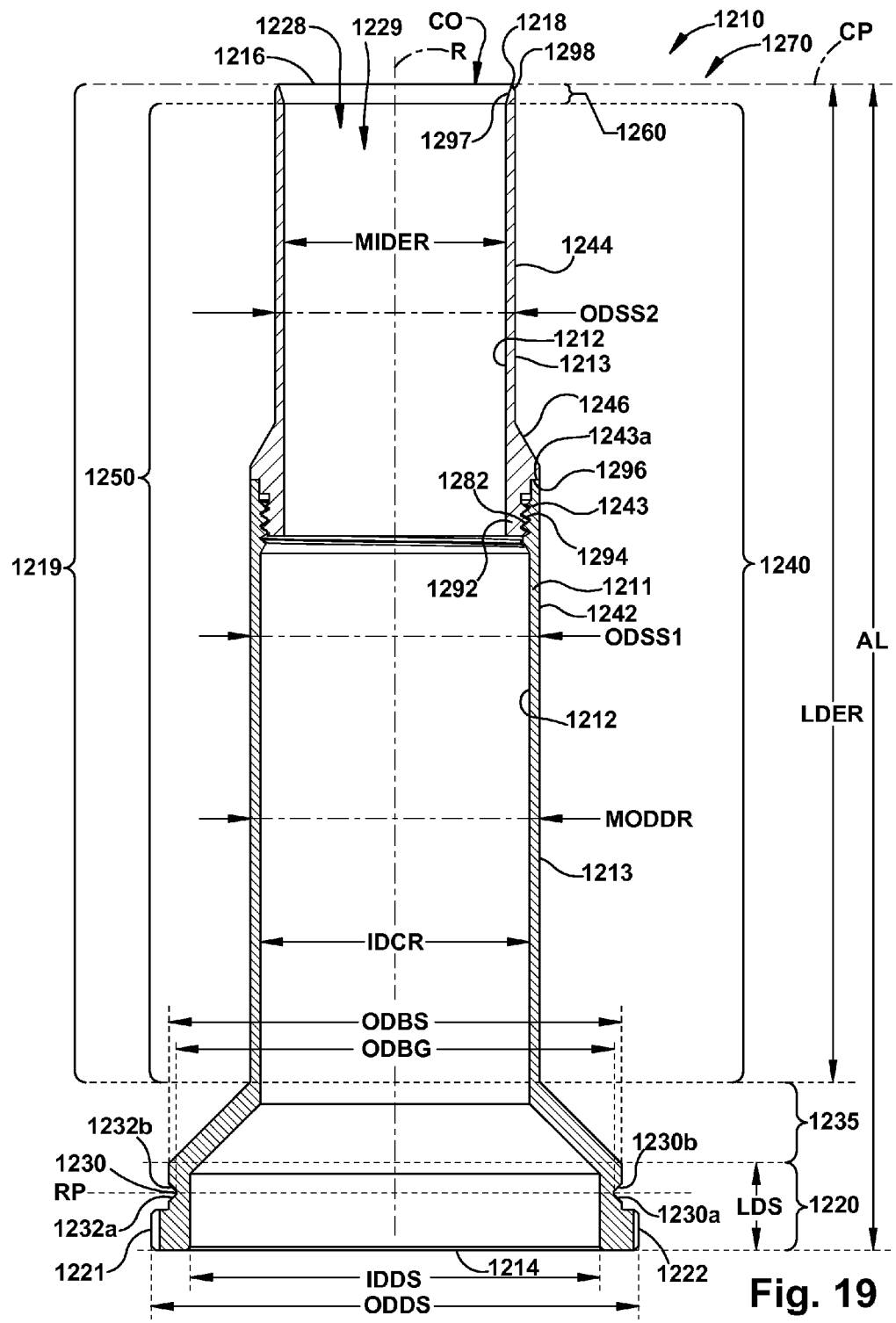
FIG. 19 is a schematic longitudinal, section view of an annular rotary knife blade of a head assembly of the power operated rotary knife blade of FIG. 13.

The rotary knife blade 1210 of the power operated rotary knife 1200 of the second exemplary embodiment is of a different design than the rotary knife blade 210 of the power operated rotary knife 100 of the first exemplary embodiment. Specifically, as best seen in FIGS. 15, 17 and 19, in one exemplary embodiment, the spacer section 1240 of the blade includes three regions 1242, 1244, 1246 defining two differing spacer section diameters ODSS1, ODSS2. One of the cutting operations envisioned for the power operated rotary knife 1000, with the vacuum attachment assembly 1600, was the efficient cutting/trimming/removal of meat from a turkey carcass typically referred to as the "oyster" meat. The so-called turkey oysters are two small, round pieces of dark meat on the back of a turkey (or other poultry carcass) near the thigh, in the hollow on the dorsal side of the ilium bone. To efficiently remove the oyster meat from the turkey carcass given the small cavity where the oyster meat is located, it was desirable to reduce the outer diameter of the rotary knife blade 1210 at the distal end 1218 or cutting edge 1216 of the blade 1210 to an even greater extent than the rotary knife blade 210 of the first embodiment of the power operated rotary knife 100. Thus, in the rotary knife blade 1210 of the second embodiment power operated rotary knife 1000, the spacer section 1240 was further tapered down to a smaller diameter, that is, the first spacer section diameter ODSS1 is tapered down to second spacer section diameter ODSS2 to obtain a final smaller distal end blade diameter (ODSS2), in addition to the tapered transition section 1235 between the drive section 1220 and the spacer section 1240. Essentially, in the rotary knife blade 1210, a second tapered region (transition spacer region 1246) is utilized to further reduce the distal end blade diameter, as compared to the first embodiment rotary knife blade 210. In one exemplary embodiment, the distal end blade diameter ODSS2 of the rotary knife blade 1210 is approximately 1.06 in. compared to the distal end blade diameter ODDER of approximately 1.52 in. of the rotary knife blade 210 of the first embodiment.

As mentioned above, the annular rotary knife blade 1210 of the head assembly 1200 includes a generally cylindrical annular body 1211. The annular body 1211 of the rotary knife blade 1210 includes an inner wall 1212 and a radially spaced apart outer wall 1213 and extends from a first, proximal end 1214 and a second, distal end 1216, which defines the cutting edge 1218 of the blade. The annular body 1211 of the rotary knife blade 1210 includes an annular drive section 1220, adjacent the proximal end 1214 of the blade 1210, an intermediate, elongated spacer section 1240, and a blade section 1260, adjacent the distal end 1216 of the blade 1210. A tapered transition section 1235 extends between the drive section 1220 and the spacer section 1240. The tapered transition section 1235 defines a necked-down tapered region 1237 that transitions from a larger diameter of the annular drive section 1220 to a smaller diameter of the spacer section 1240 and a smaller diameter of the blade section 1260. The spacer section 1240 and the blade section 1210 define a distally extending region 1219 of the rotary knife blade 1210. In one exemplary embodiment, the spacer section 1240 comprise a first diameter proximal spacer region 1242, a second, smaller diameter distal spacer region 1244 and a third transition spacer region 1246 that bridges the respective outer diameters of the first and second spacer regions 1242, 1244. In one exemplary embodiment, an outer diameter ODSS1 of the first diameter proximal spacer region 1242 is approximately 1.28 in., while an outer diameter ODSS2 of the smaller second diameter distal spacer region 1244 is approximately 1.06 in.

Advantageously, the annular blade section 1260 and the annular spacer section 1240 of the power operated rotary knife 1210 have a reduced outer diameter compared with an outer diameter of the drive section 1220. The reduced outer diameter of the blade and spacer sections 1260, 1240 affords reduced drag and ease of manipulation and position of a distally extending region 1219 of the rotary knife blade 1210 which is likely to contact the product during cutting and trimming operations. Further, the larger outer diameter of the drive section 1220, which allows for a diameter of a driven gear 1221 formed on the outer wall 1213 of the annular body 1211 to be larger, as compared to the distally extending region 1219, thereby providing a mechanical advantage with respect to rotatably driving the blade 1210 versus a smaller driven gear diameter.

The drive section 1220 of the rotary knife blade 1210 defines the driven gear 1221 comprising a set of involute spur gear teeth 1222 extending from the outer wall 1213 for rotatably driving the blade 1210 about its central axis of rotation R. The drive section 1220 further includes a radially inwardly extending generally V-shaped bearing groove or bearing race 1230, also formed by the outer wall 1213 of the rotary knife blade 1210. The bearing groove or race 1230 is axially spaced from and distal to, that is axially above (as seen in FIG. 19), the gear teeth 1222. The bearing groove 1230 of the rotary knife blade 1210 engages a bearing bead 1320 of the blade housing 1300 thereby defining a bearing structure 1299 for rotatably supporting the blade 1210 for rotation about the axis of rotation R. The bearing structure 1299 defines a rotational plane RP of the rotary knife blade 1210 that is substantially orthogonal to the central axis of rotation R of the blade 1210, substantially orthogonal to the central axis BHCA of the blade housing 1300, substantially orthogonal to the longitudinal axis LA of handle assembly 1110, substantially orthogonal to the central axis ACA' of the vacuum adapter 1610, substantially orthogonal to the vacuum hose axis VHA, and transverse to the gripping axis GA pistol grip handle 1126.

The annular rotary knife blade 1210 is an annular structure defining the annular body 1211 that is generally cylindrical and tapered from the proximal drive section 1220 to the distal blade section 1260. The rotary knife blade 1210 extends from the proximal end 1214 to the axially spaced apart distal end 1216 and includes the inner wall 1212 and the radially spaced apart outer wall 1213. The inner wall 1212 of the rotary knife blade 1210 defines an interior region 1228 and a throughbore 1229 extending through the blade 1210 and longitudinally centered about the axis of rotation R. Except for the blade cutting edge 1218 adjacent the distal end 1216 of the annular body 1211 where the outer wall 1213 and the inner wall 212 angle toward each other to define the cutting edge 1218; the inner and outer walls 1212, 1213 are generally parallel. As previously described, the drive section 1220 includes, adjacent the proximal end 1214, the driven gear 1221 which, in one exemplary embodiment is an involute spur gear comprising the plurality of involute gear teeth 1222. The outer wall 1213 of the drive section 1220 further includes the radially inwardly extending bearing groove 1230 which is axially spaced from the driven gear 1221 along the blade axis of rotation R. The bearing groove 1230 defines axially spaced apart lower and upper frustoconical surfaces 1232a, 1232b. The frustoconical surfaces 1232a, 1232b define the bearing faces 1230a, 1230b of the bearing groove 1230 of the rotary knife blade 1210 which contact and bear against the upper and lower axially spaced apart bearing surfaces 1322a, 1322b of the bearing surface 1322 of the blade housing bead 1320 when the rotary knife blade 1210 is supported in the blade housing 1300. The blade bearing structure 1299 of the power operated rotary knife 1000 comprises the above-described bearing interface to rotatably support the blade 1210 for rotation.

In one exemplary embodiment, an inner diameter IDDS of the drive section 220 is approximately 1.81 in., while a maximum outer diameter ODDS of the drive section 220, that is the outer diameter in the region of the driven gear 1221, is approximately 2.16 in. In one exemplary embodiment, an outer diameter ODBS of the drive section 1220 adjacent the bearing groove 1230 is approximately 2.00 in., while an outer diameter ODBG of the drive section 1220 within the bearing groove 230 is approximately 1.93 in. The outer diameter ODBG also defines a minimum outer diameter of the drive section 220. In one exemplary embodiment, an axial length LDS of the drive section 1220 is approximately 0.39 in. and extends from the proximal end 1214 of the rotary knife blade 1210 to the transition section 1235. In one exemplary embodiment, an axial length LDER of the distally extending region 1219, which includes the spacer section 1240 and the blade section 1260, is approximately 6.27 in.

As noted above, with regard to the spacer section 1240, an outer diameter ODSS1 of the first diameter proximal spacer region 1242 is approximately 1.28 in., while an outer diameter ODSS2 of the smaller second diameter distal spacer region 1244 is approximately 1.06 in. The outer diameter ODSS1 of the first diameter proximal spacer region 1242 of the distally extending region 1219 also defines the maximum outer diameter of the spacer section 1240, namely, 1.28 in. The maximum outer diameter of the blade section 1260 is equal to the outer diameter ODSS2 of the second diameter distal spacer region 1244, namely, 1.06 in. Thus, in the rotary knife blade 1210 of the present disclosure, a maximum outer diameter of the spacer section 240 (shown by ODSS1 (1.28 in.)) is smaller than a minimum outer diameter ODBG (1.93 in) of the drive section 220 and a maximum outer diameter of the blade section 260 (shown by ODSS2 (1.06 in.) is smaller than the minimum outer diameter ODBG (1.93 in.) of the drive section 220.

In one exemplary embodiment, the maximum outer diameter of the second diameter distal spacer region 1244 of the spacer section 1240 and the maximum outer diameter of the blade section 1260 are the same and are equal to 1.06 in. The maximum outer diameter MODDR of the distally extending region 219 is defined by outer diameter ODSS1 of the first diameter proximal spacer region 1242 (1.93 in.). In one exemplary embodiment, the maximum outer diameter MODDR (1.28 in) of the distally extending region 1219 is less than or equal to 70% of the minimum outer diameter (ODBG—1.93 in) of the drive section. Advantageously, this reduced diameter configuration of the rotary knife blade 1210 maintains the mechanical advantage of having a larger diameter drive gear 1221 for purposes of more easily rotating the rotary knife blade 1210 with the drive motor, while, at the same time, the smaller outer diameter of the distally extending region 1219 affords reduced blade drag and facilitates ease of manipulation of the blade 1210 when the blade is used for example for trimming or cutting operations.

The tapered transition section 1235 and the cylindrical spacer section 1240 of the rotary knife blade 1210 extend between the drive section 1220 and the blade section 1260. The transition section 1235 is adjacent the drive section 1220, while the spacer section 1240 defines a stepped distal cylindrical region 1250 extending between the tapered transition section 1235 and the blade section 1260. The stepped distal cylindrical region 1250 defined by the spacer section 1240 comprises the first diameter proximal spacer region 1242, the second, smaller diameter distal spacer region 1244 and the third transition spacer region 1246 that bridges the respective outer diameters of the first and second spacer regions 1242, 1244. Thus, the rotary knife blade 1210 includes two transition sections or regions, namely transition section 1235 and transition spacer region 1246. An outer wall of the tapered transition region 1235 tapers between a larger outer diameter ODBS at a distal end of the drive section 1240 and the outer diameter ODSS1 at a proximal end of the spacer section 1240. In one exemplary embodiment, a maximum inner diameter IDCR of the spacer section 1240 is approximately 1.21 in., while an axial length of the spacer section 240 is approximately 6.18 in. In one exemplary embodiment, the rotary knife blade 210 has an overall axial length AL of approximately 7.00 in. and a minimum inner diameter MIDER of the distally extending region 1219 is approximately 0.98 in. As noted above, in one exemplary embodiment of the rotary knife blade 1210, the axial length LDER of the distally extending region 1219, comprising the spacer section 1240 and the blade section 1260, is approximately 6.27 in., while the overall axial length AL of the rotary knife blade 1210 is 7.00 in. Accordingly, in one exemplary embodiment, the distally-extending or forwardly-extending, reduced outer diameter distally extending region 219 comprises or accounts for approximately 90% of the overall axial length AL of the rotary knife blade 1210. Advantageously, this rotary knife blade configuration, which has the reduced outer diameter, forwardly extending region 1219 accounting for approximately 90% of the total axial extent AL of the blade 1210, facilitates ease of insertion and manipulation of the blade edge 1218 within narrow openings in a product. For example, the reduced outer diameter coupled with the large axial length (compared to the overall blade length) of the distally extending region 1219 of the rotary knife 1210 facilitates an operator of the power operated rotary knife 1000 manipulating the knife such that the distally extending region 1219 of the blade 1210 may be moved forward and inserted into a narrow portion or region of, for example, an abdominal cavity of a carcass for the purposed of trimming an internal pocket of fat tissue deep within the abdominal cavity, while the vacuum attachment assembly 1600 advantageously provides for vacuum removal and collection of the trimmed pieces of meat or fat tissue as they are trimmed without the necessity of the operator picking up or otherwise collecting the trimmed pieces of meat or fat tissue.

One of skill in the art will understand and appreciate that the dimensions and configuration of the rotary knife blade 1210 may vary depending on the cutting/trimming applications that the rotary knife blade 1210 is contemplated for use in connection with. The foregoing dimensions and specific configuration of the rotary knife blade 1210 is by way of example, without limitation, and the present disclosure contemplates other dimensions and configurations of the rotary knife blade 1210 depending on the specific cutting and trimming applications.

Two Part Rotary Knife Blade 1270

In one exemplary embodiment, the annular rotary knife blade 1210 of the present disclosure is a two-part annular rotary knife blade 1270 including a proximal carrier component or portion 1280 and a blade component or portion 1290 which are releasably connected via a threaded engagement. The drive section 1220 and the first diameter proximal region 1242 of the spacer section 240 comprise the carrier component 1280, while the blade section 1260, the second diameter proximal region 1244, and the spacer region 1246 comprise the blade component 1290. The blade component 1290 includes a proximal connection region 1292 which includes an externally threaded outer wall 1294. The threaded outer wall 1294 threads into a mating threaded inner wall 1282 of the carrier portion 1280, specifically a threaded distal portion 1243 of the first diameter proximal spacer region 1242 of the spacer section 1240. In one exemplary embodiment, the threaded outer wall 1294 of the proximal connection region 1292 of the blade component 1290 includes right-hand threads for a threaded engagement between the blade component 1290 and the carrier component 1280. The blade component 1290 includes a radially extending shoulder 1296 that seats against an upper or distal surface 1243a of the first diameter proximal spacer region 1242 of the spacer section 1240 bridging the inner and outer walls 1212, 1213 when the blade component 1290 is fully threaded into the carrier component 1280.

Angled distal tapered regions 1298, 1299 of the blade component 290 extend from the respective inner and outer walls 1212, 1213 and intersect to define the cutting edge 1218 of the blade section 1260. The blade component 1290 defines a "straight blade" configuration. One of skill in the art will recognize that the configuration of the blade component 1290 may be changed depending on the specific cutting trimming application, for example, the blade component 290 may be a "hook blade" or a "flat blade" configuration, as discussed above with respect to the first embodiment of the power operated rotary knife 100. Again, one of skill in the art will understand that the dimensions and configuration of an exemplary embodiment of the rotary knife blade 210, as stated above and as shown in the Figures, may vary depending on the cutting/trimming applications that the rotary knife 1000 will be used for. Additionally, the rotary knife blade 1210 may be fabricated as a one-piece or one-part blade.

Advantageously, the central axis of rotation R of the rotary knife blade 1210 is radially offset by a radial offset distance RO (FIG. 16) from and substantially parallel to the longitudinal axis LA of handle assembly 1110. The radially offset and parallel configuration between the rotary knife blade 1210 and the handle assembly 1110 allows the adapter 1610 of the vacuum attachment assembly 1600 to be directly connected to the lower or proximal end 1306 of the blade housing 1300 and further allows a general extent or longitudinal axis VHA of a vacuum hose 1680 of the vacuum attachment assembly 1610 in the proximal region 1683 of the vacuum hose 1680 to be substantially parallel to the handle assembly longitudinal axis LA and the axis of rotation R of the rotary knife blade 1210 for efficient extraction of cut or trimmed material (removed material) by the vacuum attachment assembly 1600, as explained above.

Vacuum Adapter 1610 of Vacuum Attachment Assembly 1600

The vacuum adapter 1610 of the vacuum attachment assembly 1600 of the power operated rotary knife 1000 of the second exemplary embodiment is of a different design than the vacuum adapter 610 of the power operated rotary knife 100 of the first exemplary embodiment. Specifically, the proximal cylindrical body 1612 is not angled with respect to the distal upper annular boss 1612, but instead has a straight axial configuration such that the central axis ACA' defined by the interior region 1639 is substantially aligned with and coincident or congruent with the central axis of rotation R of the rotary knife blade 1210. The straight axial configuration of the vacuum adapter 1620 is advantageous. Additionally, the manufacturing cost of the adapter 1610 is reduced, as compared to the angled adapter 610 of the first embodiment, because the design is less complex being that there is no angled portion.

As can best be seen in FIGS. 14, 15, 16, 20 and 21, the vacuum attachment assembly 1600 includes the vacuum adapter 1610, a hose clamp 1640 and the vacuum hose 680. The vacuum adapter 1610 includes the proximal body 1612 and the larger diameter upper annular boss 1614. The vacuum adapter throughbore 1611 extends between a first proximal end 1620 and a second distal end 1622 of the adapter 1610 and defines the interior region 1639 of the adapter 1610. The throughbore 1611 defines the central axis ACA' of the adapter 1610, as described above. The proximal body 612 has the general shape of a cylinder. Extending from an upper end 1613 of the body 1612 is the radially outwardly and axially upwardly extending annular boss 1614. The outer wall 1616 of the annular boss 1614 includes the arcuate groove 1618 that receives the radially inwardly extending lip 1360 of the inner wall 1302 of the blade housing 1300 in the region of the blade housing split 1310.

As described above, with respect to the blade housing 300 and the annular boss 614 of the vacuum adapter 610 of the power operated rotary knife 100 of the first exemplary embodiment and as best seen in FIGS. 20 and 21, the annular boss 1614 includes the upwardly or axially extending blade housing clamp 1630 which, in turn, includes horizontally, radially outwardly extending tongue 1632. The radially extending tongue 1632 extends thought a lower slot 1340 (FIG. 15) of the blade housing 1300 and into the slotted recess 1432 (FIG. 16, also seen as 432 in FIG. 9 of the first embodiment power operated rotary knife 100) of the enlarged head 1420 of the frame 1400. The pair of fasteners 1440 (FIG. 15) on either side of the frame throughbore 1402 threaded into respective threaded openings 1634 in the tongue 1632 to clamp together the vacuum adapter 1610, the blade housing 1300 and the frame 1400. Stated another way, when the pair of fasteners 1440 of the frame 1400 threadedly engage the respective threaded openings 1634 of the housing clamp 1630 of the vacuum adapter 1610, the vacuum adapter 1610 bears against the blade housing 1300 in a region of the blade housing split 1310 to releasably affix the blade housing 1300 to the frame 1400 and to releasably affix the vacuum attachment assembly 1600 to the frame 1400. The blade housing 1300 is sandwiched between the vacuum adapter 1610 and frame 1400 as the pair of fasteners 1440 are tightened into the threaded openings 1634 of the tongue 1632 of the housing clamp 1630.

The proximal body 1612 of the adapter 1610 defines a sleeve that receives an end portion 1682 of the flexible vacuum hose 1680. An exterior hose clamp 1640 secures the end portion 1682 of the vacuum hose 1680 to the adapter proximal body 1612. In one exemplary embodiment, an inner diameter of the vacuum hose 1680 is approximately 1.5 in. The vacuum hose 1680 defines the central opening or throughbore 1681 which, in turn defines the interior region 1686 of the vacuum hose 1680.

As noted previously, because the pistol grip handle 1127 angles away from the handle assembly longitudinal axis LA and the vacuum hose 1680, there is no need to angle the vacuum hose 1680 away from the handle assembly 1110 to provide clearance for the operator's hand or fingers as the handle assembly 1110 is grasped by the operator. Accordingly and advantageously, a central axis ACA' of the vacuum adapter 1610 is substantially coincident or congruent with the rotary knife blade axis of rotation R and is substantially parallel with the handle assembly longitudinal axis LA. This structure of the vacuum adapter 1610 advantageously provides for a straight-line or in-line flow (depicted as MF in FIGS. 16 and 17) of cut or trimmed material from the cutting edge 1218 of the rotary knife blade 1210, through the rotary knife blade interior region 1228, through the blade housing interior region 1301, through the vacuum adapter interior region 1639, and into the vacuum hose interior region 1686. Additionally, this structure of the vacuum adapter 1610 advantageously keep the front profile of the power operated rotary knife 1001 as small as possible given the need for the knife 1000 to be inserted into and manipulated in narrow body cavities. The front profile of the rotary knife 1000, the boundaries of which are shown schematically by dimensions FP1', FP2' in FIG. 18, may be viewed as an approximate total frontage area or area effectively occupied by the power operated rotary knife 1000 when looking in a proximal direction P (FIG. 16) toward a distal end 1001 of the knife 1000 along a line of the axis of rotation R.

The throughbore 1681 and interior region 1686 of the vacuum hose 1680 are in fluid communication with the throughbore 1611 and the interior region 1639 of the vacuum adapter 1610 which are in fluid communication with the throughbore 1370 and the interior region 1301 of the blade housing 1300 which are in fluid communication with the throughbore 1229 and interior region 1228 of the rotary knife blade 1210. Accordingly, when the vacuum attachment assembly 1600 is assembled to the blade housing 1300 and the rotary knife blade 1210 is assembled to the blade housing 1300 and a vacuum pump (not shown) is actuated to draw a vacuum pressure in the vacuum hose 1680, because of the fluid communication between the vacuum attachment assembly 1600, the blade housing 1300 and the rotary knife blade 1210 of the head assembly 1200, vacuum pressure will be present in the interior region 1228 and the throughbore 1229 of the rotary knife blade 1210. Thus, cut or trimmed product (removed material), cut by the cutting edge 1218 of the blade 1210 will be pulled or routed along the material flow path MF by the vacuum pressure in a proximal or rearward direction though the aligned throughbores 1229, 1370, 1611, 1681 and, ultimately, routed through the vacuum hose 1680 where the removed material is collected in a canister (not shown) for further processing, inspection, grading, packaging, or disposal, depending on the nature of the removed material.

In one exemplary embodiment of the power operated rotary knife 1000, like the power operated rotary knife 100 of the first exemplary embodiment, the handle housing 1112 may be fabricated of stainless steel, while the hand piece

1124 may be fabricated of plastic or other material or materials known to have comparable properties and may be formed by molding and/or machining, for example, the hand piece may be fabricated of two over molded plastic layers, an inner layer comprising a hard plastic material and an outer layer or gripping surface comprised of a softer, resilient plastic material that is more pliable and easier to grip for the operator. The frame 1400 of the head assembly 1200 may be fabricated of aluminum or stainless steel or other material or materials known to have comparable properties and may be formed/shaped by casting and/or machining. The blade and blade housing 1400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. The vacuum adapter 1610 of the vacuum attachment assembly 1600 may be fabricated of aluminum or steel.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A power operated rotary knife comprising:
an elongated handle assembly defining a handle assembly longitudinal axis;
a head assembly coupled to and extending from a distal end of the handle assembly, the head assembly including a rotary knife blade supported by a blade housing for rotation about a central axis of rotation, the rotary knife blade including an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body, and a blade section adjacent a second end of the annular body, the head assembly further including a frame, the blade housing and the handle assembly releasably coupled to the frame, the blade housing being radially offset from the handle assembly longitudinal axis such that the central axis of rotation of the rotary knife blade is spaced apart from and is substantially parallel to the handle assembly longitudinal axis; and
a vacuum attachment assembly including a vacuum adapter and a vacuum hose, the vacuum adapter having a proximal end and an axially spaced apart distal end, an inner wall defining a central open region of the vacuum adapter extending from the proximal end to the distal end, the open central region of the vacuum adapter defining an adapter central axis and being in fluid communication with the central open region of the annular body of the rotary knife blade, the vacuum hose secured to the proximal end of the vacuum adapter, the distal end of the vacuum adapter including a housing clamp coupled to the frame with the blade housing secured between the housing clamp and the frame, the adapter central axis extending substantially parallel to the central axis of rotation of the rotary knife blade.

2. The power operated rotary knife of claim 1 wherein the adapter central axis is substantially coincident with the axis of rotation of the rotary knife blade.

3. The power operated rotary knife of claim 1 wherein the adapter central axis extends substantially parallel to the handle assembly longitudinal axis.

4. The power operated rotary knife of claim 1 wherein the adapter includes an adapter body at the proximal end of the adapter and an annular boss at the distal end of the adapter extending from the adapter body.

5. The power operated rotary knife of claim 1 wherein the elongated handle assembly comprises a handle housing including a hand piece and a hand piece retaining assembly which secures the hand piece 1124 to the frame, the hand piece including a hand piece body extending along the handle assembly longitudinal axis and a pistol grip handle defining a gripping surface, the pistol grip handle extending along a gripping axis transverse to and intersecting the handle assembly longitudinal axis.

6. The power operated rotary knife of claim 4 wherein the annular boss includes a radially extending tongue that passes through a slot in a side wall of the blade housing and is received in a recess in a mounting region of the frame.

7. The power operated rotary knife of claim 4 wherein the annular boss includes an outer wall defining an arcuate groove and the mounting region of the blade housing includes an inner wall defining a radially inwardly extending lip, the radially inwardly extending lip being received in the arcuate groove of the annular boss.

8. The power operated rotary knife of claim 1 wherein the blade housing includes a longitudinally extending split through the blade housing, the frame includes an arcuate mounting region and the vacuum adapter includes a housing clamp, the housing clamp of the vacuum adapter bearing against the blade housing in a region of the split to releasably affixed the blade housing to the frame and to releasably affix the vacuum attachment assembly to the frame.

9. The power operated rotary knife of claim 1 wherein the drive section of the rotary knife blade further includes a radially inwardly extending bearing groove in the outer wall of the annular body, the bearing groove defining first and second axially spaced apart bearing faces and the blade housing including an inner wall, the inner wall defining a radially outwardly extending bearing bead including upper and lower bearing surfaces, the lower bearing surface of the blade housing bearing bead bearing against the first bearing face of the bearing groove of the rotary knife blade and the upper bearing surface of the blade housing bearing bead bearing against the second bearing face of the bearing groove of the rotary knife blade to rotatably support the rotary knife blade for rotation about the central axis of rotation.

10. The power operated rotary knife of claim 1 wherein the rotary knife blade includes a spacer section intermediate the drive section adjacent the first end of the annular body and the blade section adjacent the second end of the annular body and a maximum outer diameter of the spacer section of the rotary knife blade is smaller than a minimum outer diameter of the drive section and a maximum outer diameter of the blade section is smaller than the minimum outer diameter of the drive section.

11. A head assembly for a power operated rotary knife comprising:
   a rotary knife blade and a blade housing, the rotary knife blade supported by the blade housing for rotation about a central axis of rotation, the rotary knife blade including an annular body having an inner wall and a radially spaced apart outer wall, the inner wall defining a central open region extending from a first end to a spaced apart second end of the annular body and a drive section adjacent a first end of the annular body, the drive section defining a driven gear including a set of gear teeth formed in the outer wall of the annular body, and a blade section adjacent a second end of the annular body;
   a frame releasably supporting the blade housing; and
   a vacuum attachment assembly including a vacuum adapter and a vacuum hose, the vacuum adapter having a proximal end and an axially spaced apart distal end, an inner wall defining a central open region of the vacuum adapter extending from the proximal end to the distal end, the open central region of the vacuum adapter defining an adapter central axis and being in fluid communication with the central open region of the annular body of the rotary knife blade, the vacuum hose secured to the proximal end of the vacuum adapter, the distal end of the vacuum adapter including a housing clamp coupled to the frame with the blade housing secured between the housing clamp and the frame, the adapter central axis extending substantially parallel to the central axis of rotation of the rotary knife blade.

12. The head assembly of claim 11 wherein the adapter central axis is substantially coincident with the axis of rotation of the rotary knife blade.

13. The head assembly of claim 11 wherein the adapter includes an adapter body at the proximal end of the adapter and an annular boss at the distal end of the adapter extending from the adapter body.

14. The head assembly of claim 13 wherein the adapter body is cylindrical.

15. The head assembly of claim 13 wherein the annular boss includes a radially extending tongue that passes through a slot in a side wall of the blade housing and is received in a recess in a mounting region of the frame.

16. The head assembly of claim 13 wherein the annular boss includes an outer wall defining an arcuate groove and the mounting region of the blade housing includes an inner wall defining a radially inwardly extending lip, the radially inwardly extending lip being received in the arcuate groove of the annular boss.

17. The head assembly of claim 11 wherein the blade housing includes a longitudinally extending split through the blade housing, the frame includes an arcuate mounting region and the vacuum adapter includes a housing clamp, the housing clamp of the vacuum adapter bearing against the blade housing in a region of the split to releasably affixed the blade housing to the frame and to releasably affix the vacuum attachment assembly to the frame.

18. The head assembly of claim 11 wherein the drive section of the rotary knife blade further includes a radially inwardly extending bearing groove in the outer wall of the annular body, the bearing groove defining first and second axially spaced apart bearing faces and the blade housing including an inner wall, the inner wall defining a radially outwardly extending bearing bead including upper and lower bearing surfaces, the lower bearing surface of the blade housing bearing bead bearing against the first bearing face of the bearing groove of the rotary knife blade and the upper bearing surface of the blade housing bearing bead bearing against the second bearing face of the bearing groove of the rotary knife blade to rotatably support the rotary knife blade for rotation about the central axis of rotation.

19. The head assembly of claim 11 wherein the rotary knife blade includes a spacer section intermediate the drive section adjacent the first end of the annular body and the blade section adjacent the second end of the annular body and a maximum outer diameter of the spacer section of the rotary knife blade is smaller than a minimum outer diameter of the drive section and a maximum outer diameter of the blade section is smaller than the minimum outer diameter of the drive section.

20. The head assembly of claim 11 wherein a central axis of the vacuum hose is coincident with the adapter central axis.

* * * * *